US012613977B2

(12) United States Patent　(10) Patent No.:　US 12,613,977 B2
Kuroda et al.　(45) Date of Patent:　Apr. 28, 2026

(54) AUTOMATED SYSTEM DESIGN APPARATUS, AUTOMATED SYSTEM DESIGN METHOD AND NON-TRANSITORY STORAGE MEDIUM

(71) Applicant: NEC Corporation, Tokyo (JP)

(72) Inventors: Takayuki Kuroda, Tokyo (JP); Toshiki Watanabe, Tokyo (JP); Takuya Kuwahara, Tokyo (JP); Ryosuke Hotchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 36 days.

(21) Appl. No.: 18/667,004

(22) Filed: May 17, 2024

(65) Prior Publication Data

US 2025/0103727 A1　　Mar. 27, 2025

(30) Foreign Application Priority Data

Sep. 26, 2023　(JP) ................................. 2023-162944

(51) Int. Cl.
G06F 21/57　　　(2013.01)
(52) U.S. Cl.
CPC ...... G06F 21/577 (2013.01); G06F 2221/034 (2013.01)
(58) Field of Classification Search
CPC ............. G06F 21/577; G06F 2221/034; G06F 2221/033

USPC .......................................................... 726/25
See application file for complete search history.

(56) References Cited

U.S. PATENT DOCUMENTS

| 11,503,061 | B1 * | 11/2022 | Lin | ........................ H04L 63/102 |
| 2007/0192474 | A1 * | 8/2007 | Decasper | .............. H04L 67/306 |
| | | | | 709/223 |
| 2018/0075243 | A1 * | 3/2018 | Thomas | ................... G06F 30/20 |
| 2021/0397710 | A1 * | 12/2021 | Cohen | ..................... G06F 9/545 |
| 2022/0382878 | A1 * | 12/2022 | Maity | ................... G06F 16/245 |

FOREIGN PATENT DOCUMENTS

| JP | 2015-215885 A | 12/2015 |
| JP | 2021-135625 A | 9/2021 |

* cited by examiner

*Primary Examiner* — Meng Vang
(74) *Attorney, Agent, or Firm* — Sughrue Mion, PLLC

(57) ABSTRACT

An automated system design apparatus provided with configuration proposal generator generates a configuration proposal for a system concretized from abstract requirements for the system; facet model generator concretizes a model relating to a feature, the feature being required in the system from a facet other than a configuration of the system; and evaluator generates information required for evaluation of the configuration proposal based on the concretized model, and for evaluating the configuration proposal based on the information.

14 Claims, 22 Drawing Sheets

AUTOMATED SYSTEM DESIGN APPARATUS 800

CONFIGURATION PROPOSAL GENERATING MEANS 810

FACET MODEL GENERATING MEANS 820

EVALUATING MEANS 830

FIG. 4

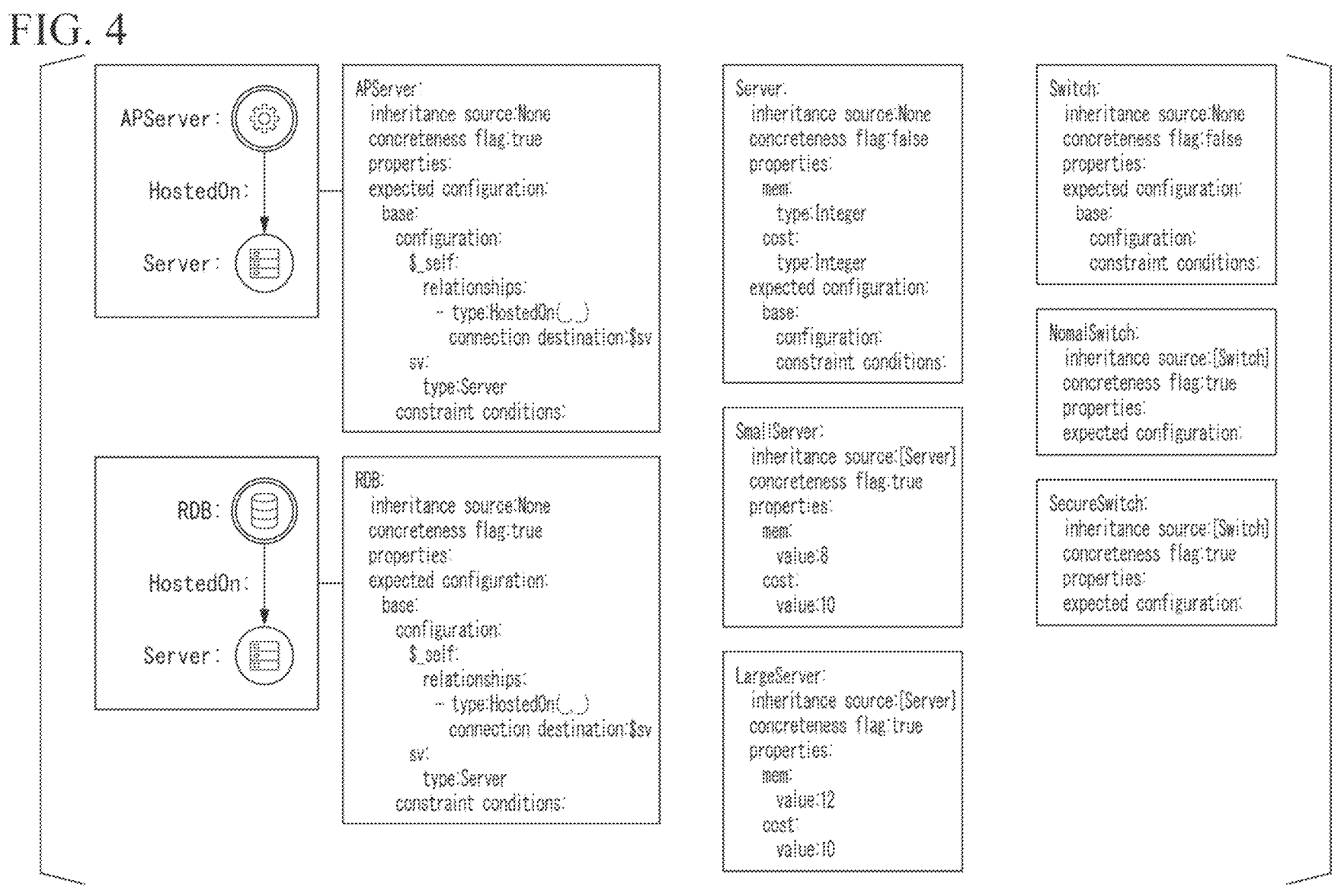

Switch:
  inheritance source:None
  concreteness flag:false
  properties:
  expected configuration:
  base:
    configuration:
    constraint conditions:

NormalSwitch:
  inheritance source:[Switch]
  concreteness flag:true
  properties:
  expected configuration:

SecureSwitch:
  inheritance source:[Switch]
  concreteness flag:true
  properties:
  expected configuration:

Server:
  inheritance source:None
  concreteness flag:false
  properties:
    mem:
      type:integer
    cost:
      type:integer
  expected configuration:
  base:
    configuration:
    constraint conditions:

SmallServer:
  inheritance source:[Server]
  concreteness flag:true
  properties:
    mem:
      value:8
    cost:
      value:10

LargeServer:
  inheritance source:[Server]
  concreteness flag:true
  properties:
    mem:
      value:12
    cost:
      value:10

APServer:
  inheritance source:None
  concreteness flag:true
  properties:
  expected configuration:
  base:
    configuration:
    $_self:
      relationships:
        - type:hostedOn(...)
          connection destination:$sv
    sv:
      type:Server
  constraint conditions:

RDB:
  inheritance source:None
  concreteness flag:true
  properties:
  expected configuration:
  base:
    configuration:
    $_self:
      relationships:
        - type:hostedOn(...)
          connection destination:$sv
    sv:
      type:Server
  constraint conditions:

APServer :
HostedOn:
Server :

RDB :
HostedOn:
Server :

```
Configuration:
  app:
    type:WebApp
constraint conditions:
  - TAT(element:$app,service:execute) <≈200
  - OPT(element:$app,operation:[S,R]) <≈60
  - Secure()==true
```

FIG. 10
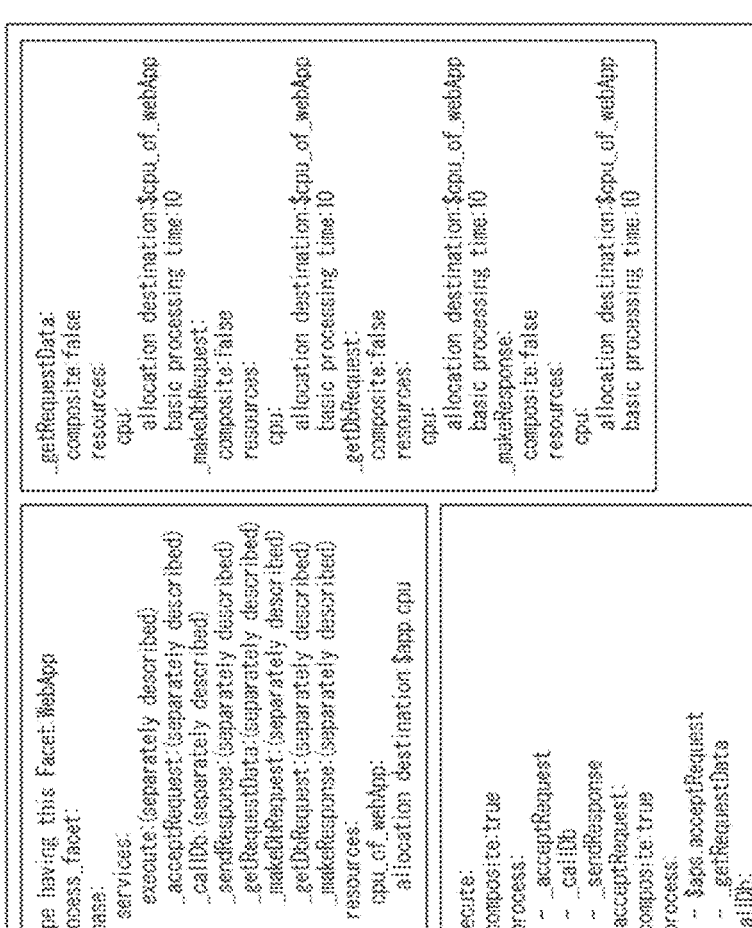
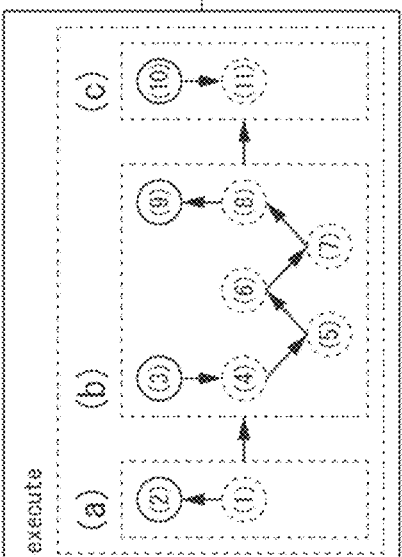

FIG. 11

```
Type having this Facet:APServer
process_facet:
  base:
    services:
      acceptRequest:
        composite:true
        process:
          - $sv.socketAccept
          - _acceptRequest
      sendResponse:
        composite:true
        process:
          - _sendResponse
          - $sv.socketSend
      sendDbRequest:
        composite:true
        process:
          - _sendData
          - $sv.socketSend
      acceptDbResponse:
        composite:true
        process:
          - $sv.socketAccept
          - _acceptData
      _acceptRequest:
        composite:false
        resources:
          cpu:
            allocation destination:$cpu
            basic processing time:10
      _sendResponse:
        composite:false
        resources:
          cpu:
            allocation destination:$cpu
            basic processing time:10
      _sendData:
        composite:false
        resources:
          cpu:
            allocation destination:$cpu
            basic processing time:10
      _acceptData:
        composite:false
        resources:
          cpu:
            allocation destination:$cpu
            basic processing time:10
    resources:
      cpu:
        allocation destination $sv.cpu
```

```
Type having this Facet:RDB
process_facet:
  base:
    services:
      processQuery:
        composite:true
        process:
          - $sv.socketAccept
          - _processQuery
          - $sv.socketSend
      _processQuery:
        composite:false
        resources:
          cpu:
            allocation destination:$cpu
            basic processing time:200
    resources:
      cpu:
        allocation destination:$sv.cpu
```

```
Type having this Facet:Server
process_facet:
  base:
    services:
      socketSend:
        composite:false
        resources:
          cpu:
            allocation destination:$cpu
            basic processing time:10
      socketAccept:
        composite:false
        resources:
          cpu:
            allocation destination:$cpu
            basic processing time:10
    resources:
      cpu:
        type:CPU
        relative speed:1
```

```
Type having this Facet:Conn
(APServer,RDB)
process_facet:
  base:
    services:
      send:
        composite:true
        arguments:
          - name:data_amount
        process:
          - $($sv1,$sv2).send
(@data_amount)
```

```
Type having this Facet:Conn
(Server,Server)
process_facet:
  base:
    services:
      send:
        composite:true
        arguments:
          - name:data_amount
        process:
          - $sv.send(@data_amount)
```

```
Type having this Facet:Switch
process_facet:
  base:
    services:
      send:
        composite:false
        arguments:
          - name:data_amount
        resources:
          channel:
            allocation destination:$channel
            data amount:@data_amount
    resources:
      channel:
        type:CommunicationChannel
        transfer amount per second:100
```

FIG. 12A

```
Type having this Facet:SmallServer
process_facet:
   base:
      services:
      resources:
         cpu:
            type:CPU
            relative speed:1
```

FIG. 12B

```
Type having this Facet:LargeServer
process_facet:
   base:
      services:
      resources:
         cpu:
            type:CPU
            relative speed:5
```

FIG. 16

```
Type having this Facet:ComIo(APServer.RDB)
operational_facet:
  base:
    state:
      S:
    transition:
      R:
        transition time:10
        depended-on states:
          - $($sv1,$sv2),R
        dependent transitions:
          - element:$($sv1,$sv2)
            pre-transition state:R
            post-transition state:S
      R:
    transition:
      S:
        transition time:1
```

```
Type having this Facet:ComIo(Server.Server)
operational_facet:
  base:
    state:
      S:
    transition:
      R:
        transition time:10
        depended-on states:
          - $sw,R
        dependent transitions:
          - element:$sw
            pre-transition state:R
            post-transition state:S
      R:
    transition:
      S:
        transition time:1
```

```
Type having this Facet:RDB
operational_facet:
  base:
    state:
      S:
    transition:
      R:
        transition time:10
        depended-on states:
          - $sv,R
        dependent transitions:
          - element:$sv
            pre-transition state:R
            post-transition state:S
      R:
    transition:
      S:
        transition time:5
```

```
Type having this Facet:AP&Server
operational_facet:
  base:
    state:
      S:
    transition:
      R:
        transition time:10
        depended-on states:
          - $sv,R
        dependent transitions:
          - element:$sv
            pre-transition state:R
            post-transition state:S
      R:
    transition:
      S:
        transition time:5
```

$($aps,$rdb).sniffing $($sv1,$sv2).sniffing $sw.sniffing

```
$self.sniffing $($sv1,$sv2).sniffing
```

```
Type having this Facet:ConnTo(APServer,RDB)
security_facet:
    base:
        threat:
            sniffing:
                type:NetworkSniffing
                executability:true
                depended-on threats:
                    ~ $($sv1,$sv2).sniffing
```

FIG. 20

```
Type having this Facet:ComTo(Server.Server)
security_facet:
  base:
    threat:
      sniffing:
        type:NetworkSniffing
        executability:true
        depended-on threats:
          - $sw.sniffing
```

```
Type having this Facet:NomalSwitch
security_facet:
  base:
    threat:
      sniffing:
        type:NetworkSniffing
        executability:true
```

```
Type having this Facet:SecureSwitch
security_facet:
  base:
    threat:
      sniffing:
        type:NetworkSniffing
        executability:false
```

$($ \$aps, \$rdb $)$ .sniffing $($ \$sv1, \$sv2 $)$ .sniffing (f)

$($ \$aps, \$rdb $)$ .sniffing $($ \$sv1, \$sv2 $)$ .sniffing

\$sw.sniffing (g)

$($ \$aps, \$rdb $)$ .sniffing $($ \$sv1, \$sv2 $)$ .sniffing

\$sw.sniffing

AUTOMATED SYSTEM DESIGN APPARATUS, AUTOMATED SYSTEM DESIGN METHOD AND NON-TRANSITORY STORAGE MEDIUM

This application is based upon and claims the benefit of priority from Japanese patent application No. 2023-162944, filed Sep. 26, 2023, the disclose of which is incorporated herein in its entirety by reference.

TECHNICAL FIELD

The present disclosure relates to an automated system design apparatus, an automated system design method, and a non-transitory storage medium.

BACKGROUND ART

In order for industry to advance, it is required to make active use of ICT (Information Communication Technology) systems (hereinafter referred to simply as systems). Generally, the configurations of systems are complicated, and the difficulty in quickly providing or modifying them presents an obstacle to making use of the systems.

In response to such problems, Patent Document 1 (Japanese Unexamined Patent Application Publication No. 2021-135625) discloses an automated design technology for generating configuration information for specific systems based on requirements (requirements relating to configurations) for the systems. According to the technology disclosed in Patent Document 1, fully concretized configuration information can be generated by repeating, in stages, operations for concretizing the configurations of abstract systems included in provided requirements. In each concretization step, multiple different configuration proposals are generated, these configuration proposals are evaluated, and the most promising one is selected as a configuration proposal to be concretized next, thereby making improvements to efficiently derive higher quality system configurations with little reworking.

In order to actually introduce a system that has been automatically designed by the technology in Patent Document 1, etc., it is required to evaluate from the facets of performance and operation regarding whether or not the system can withstand usage in a real environment. In order to appropriately evaluate the system performance, etc., information from various facets is required, such as the processing flow when executing the system, and the task flow to be implemented when a problem occurs. However, Patent Document 1 does not disclose the feature of using information from such facets to evaluate configuration proposals that are in the midst of concretization.

SUMMARY

Therefore, an example of an objective of the present disclosure is to provide an automated system design apparatus, an automated system design method, and a non-transitory storage medium that can solve the above-mentioned problem.

According to one aspect disclosed herein, an automated system design apparatus is provided with configuration proposal generator generates a configuration proposal for a system concretized from abstract requirements for the system, facet model generator concretizes a model relating to a feature, the feature being required in the system from a facet other than a configuration of the system, and evaluator generates information required for evaluation of the configuration proposal based on the concretized model, and for evaluating the configuration proposal based on the information.

According to one aspect disclosed herein, an automated system design method executed by a computer. The automated system design method includes generating a configuration proposal for a system concretized from abstract requirements for the system, concretizing a model relating to a feature, the feature being required in the system from a facet other than a configuration of the system, and generating information required for evaluation of the configuration proposal based on the concretized model, and evaluating the configuration proposal based on the information.

According to one aspect disclosed herein, a non-transitory computer-readable storage medium that stores a program makes a computer execute processes. The processes includes generating a configuration proposal for a system concretized from abstract requirements for the system, concretizing a model relating to a feature, the feature being required in the system from a facet other than a configuration of the system, and generating information required for evaluation of the configuration proposal based on the concretized model, and evaluating the configuration proposal based on the information.

BRIEF DESCRIPTION OF THE DRAWINGS

FIG. 4 is a diagram illustrating another example of type information for a configuration component.

FIG. 10 is a diagram illustrating an example of a type definition for a Process Facet.

FIG. 11 is a diagram illustrating another example of a type definition for a Process Facet.

FIG. 12A is a first diagram illustrating an example of a derivative type of a type definition for a Process Facet.

FIG. 12B is a second diagram illustrating an example of a derivative type of a type definition for a Process Facet.

FIG. 16 is a diagram illustrating another example of a type definition for an Operational Facet.

FIG. 20 is a diagram illustrating another example of a type definition for a Security Facet.

FIG. 21 is a diagram illustrating an example of a concretization process for a Security Facet.

EXAMPLE EMBODIMENT

Figure 1:
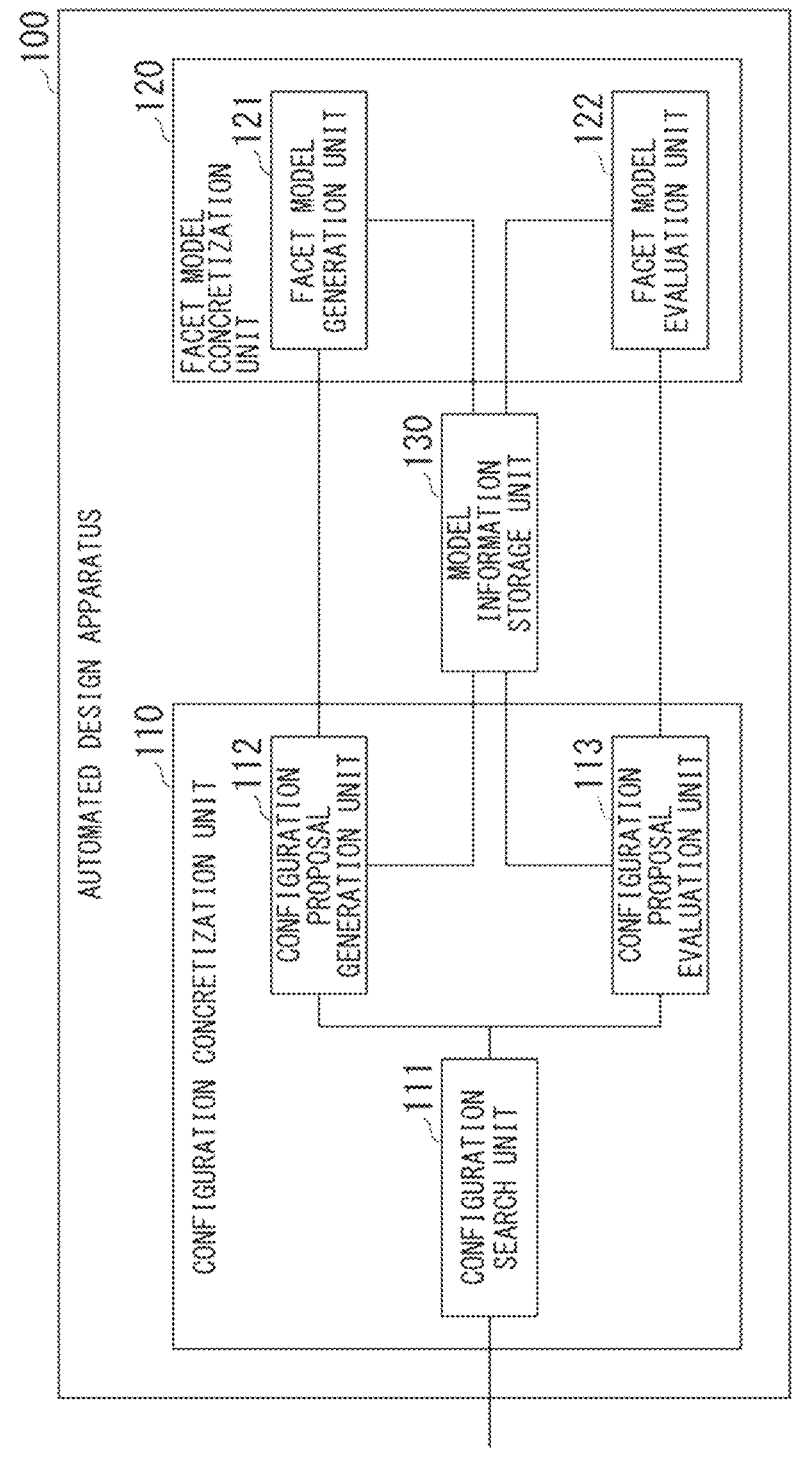
FIG. 1 is a block diagram illustrating an example of the functional configuration of an automated design apparatus.

Hereinafter, automated system design processes according to embodiments disclosed herein will be explained with reference to the drawings. Regarding the configurations of portions in the drawings used in the explanation below that are unrelated to the present disclosure, there are cases in which the description is omitted and the portions are not illustrated.

Embodiments
Configuration

FIG. 1 is a block diagram illustrating an example of the functional configuration of an automated design apparatus.

As illustrated in FIG. 1, the automated design apparatus 100 in the first embodiment is provided with a configuration concretization unit 110, a facet model concretization unit 120, and a model information storage unit 130.

The configuration concretization unit 110 receives system requirement information from an external input/output apparatus, which is not illustrated, converts the system requirement information to concrete configuration information, and outputs the configuration information.

The facet model concretization unit 120 operates in cooperation with the configuration concretization unit 110 to concretize "facet models", which is information other than required configurations for evaluation of configuration proposals in the midst of concretization, and to generate evaluation expressions required for evaluating the configuration proposals.

The model information storage unit 130 records information required for generating configuration proposals and for generating facet models.

The configuration concretization unit 110 is provided with a configuration search unit 111, a configuration proposal generation unit 112, and a configuration proposal evaluation unit 113.

The configuration search unit 111 cooperates with the configuration proposal generation unit 112 and the configuration proposal evaluation unit 113 to search for and output fully concrete system configurations satisfying provided system requirements.

The configuration proposal generation unit 112 uses model type information recorded in the model information storage unit 130 to concretize one stage of a configuration proposal provided from the configuration search unit 111, thereby generating and outputting multiple configuration proposals to the configuration search unit 111 and the facet model generation unit 121.

The configuration proposal evaluation unit 113 evaluates the configuration proposals provided by the configuration search unit 111 from various facets, such as whether or not the configuration proposals satisfy conditions designated by the system requirements, and outputs, to the facet model evaluation unit 122, the configuration proposals and constraint functions including constraint conditions applied to the configuration proposals.

The facet model concretization unit 120 is provided with a facet model generation unit 121 and a facet model evaluation unit 122.

The facet model generation unit 121, for each configuration proposal generated by the configuration proposal generation unit 112, updates a facet model linked to said configuration proposal in accordance with the specifics of partial configurations newly concretized in the configuration proposal.

The facet model evaluation unit 122 uses facet model information linked to provided configuration proposals to generate evaluation expressions for evaluating the configuration proposals.

The configuration search unit 111 is communicably connected with the configuration proposal generation unit 112 and the configuration proposal evaluation unit 113. The configuration proposal generation unit 112 is further communicably connected with the facet model generation unit 121 and the model information storage unit 130. The configuration proposal evaluation unit 113 is further communicably connected with the facet model evaluation unit 122 and the model information storage unit 130. The facet model generation unit 121 is further communicably connected with the model information storage unit 130. The facet model evaluation unit 122 is further communicably connected with the model information storage unit 130.

Next, data used by the automated design apparatus 100 of the present embodiment will be explained. First, data used in a general automated design apparatus that does not use facet models will be explained. Thereafter, the data in three types of facet models will be explained in order. First, the configuration information that is the most basic data structure disclosed herein will be explained.

Figure 2:
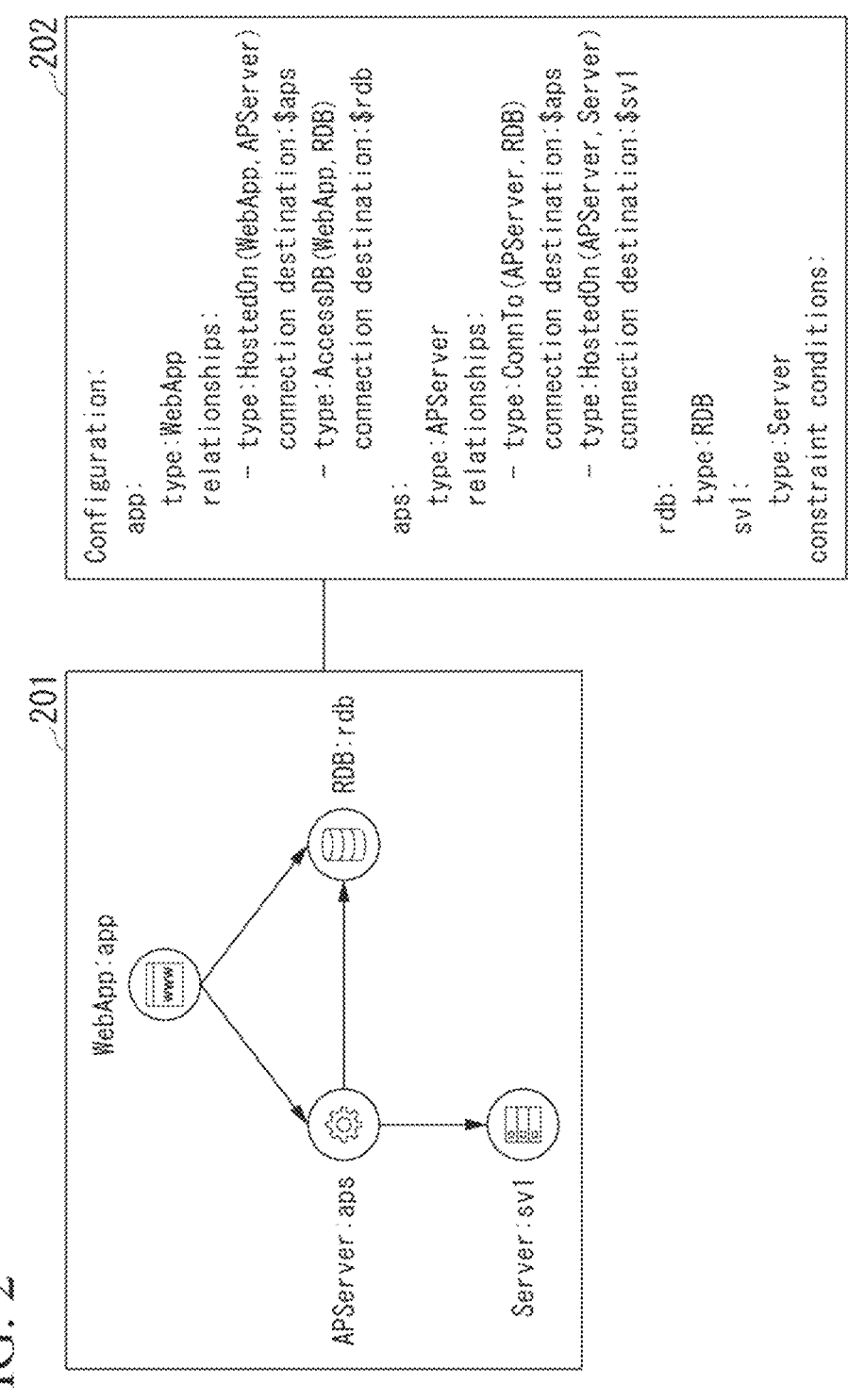
FIG. 2 is a diagram illustrating an example of configuration information.

FIG. 2 illustrates an example of configuration information in the present embodiment. In FIG. 2, the left diagram 201 shows a visual representation of the configuration information, and the right diagram 202 shows a text-based representation. The configuration information is represented by information in the form of a graph comprising nodes and edges. The nodes represent components by which a system is configured, and these are referred to as configuration components. The edges represent the relationships between the configuration components, and these are referred to as relationships. The configuration components and the relationships are collectively referred to as configuration elements. Each configuration element includes at least an ID of that configuration element and type information indicating the species of the configuration element. Additional information, such as attributes, may also be included.

In the visual representation in FIG. 2, the circles represent configuration components (nodes), and the arrows connecting the circles to each other represent relationships (edges). The labels appended to the configuration elements indicate the type and the ID, with the type name being indicated on the left side of the colon (":") and the ID being indicated on the right side. There will be cases in which one or both of the type name and the ID are omitted as appropriate. Icons corresponding to the type species are displayed, as appropriate, in the circles of the configuration components.

In the text-based representation in FIG. 2, the information is written in the YAML format. The configuration information can have a "configuration" and "constraint conditions". Examples of "constraint conditions" will be described below. In the "configuration", the IDs of configuration components included therein are listed, and information on the respective configuration components is described as attributes of the respective IDs. The "type" is the type of each configuration component. The "relationships" are relationships from each configuration component to other configuration components. The relationships are represented by an array, with a "type" and a "connection destination" being described as the attributes of each relationship. The type of a relationship includes a set of a basic type, which is the type of the relationship itself, and both end types, which are the types of configuration components at both ends. For example, in the case that "HostedOn (WebApp, APServer)" is described, "HostedOn" is the basic type and "WebApp" and "APServer" are both end types. The "connection destination" designates, in reference form, the ID of a counterpart configuration component with which a relationship is formed. The reference form is a character string having "$" appended at the head of a character string for an ID, indicating that another element is being referenced. The configuration information indicated in FIG. 2 includes the four configuration components "app", "aps", "rdb", and "sv1". Among these, taking "app" as an example, this is an element of the WebApp type, having, as relationships, a HostedOn (WebApp, APServer) type relationship with "aps" as the connection destination, and an AccessDB (WebApp, RDB) type relationship with "rdb" as the connection destination.

In the automated design apparatus 100 in the present embodiment, input information, intermediate generation information, and system requirements, configuration proposals in the midst of being designed, and concrete system configurations, which correspond to output information, are all represented by configuration information. Next, the type information of the respective configuration elements will be explained.

The type information of a configuration element has attributes including type name, inheritance source, concreteness flag, properties, and expected configuration. The respective configuration element types can inherit another configuration element type by designating the name of that type as an inheritance source. A configuration element type, by inheriting another configuration element type, can inherit the information of the inheritance source, and may be overwrite or extend information by adding just the portions that are different from the type information of the inheritance source. An inheriting type is referred to as a derivative type or an extension type, and is considered to be a species of the type of the inheritance source. The concreteness flag is a flag representing whether or not that type is a concrete type. The properties are information representing attribute values that can be held by that type. The expected configuration refers to peripheral configurations that requires to be satisfied in order for a configuration component with a certain type to establish concrete configuration information. For example, a WebApp type component is required to be connected with both an APServer type configuration component by a HostedOn (WebApp, APServer) type relationship and with an RDB type configuration component by an AccessDB (WebApp, AccessDB) type relationship, and the APServer type configuration component is required to be connected with the RDB type configuration component by a ConnTo (APServer, RDB) type relationship. Such conditions that a certain configuration component requires in peripheral configurations are designated as expected configurations. Although a single configuration element can include multiple expected configurations, the present description will not deal with examples of type information including two or more expected configurations. As mentioned below, the concreteness flag and the expected configuration are used as ending conditions for the automated design search process. That is, part of the ending conditions for the automated design search process is that, for all of the configuration elements included in a certain configuration, the types thereof are concrete types and the expected configuration is satisfied.

Figure 3:
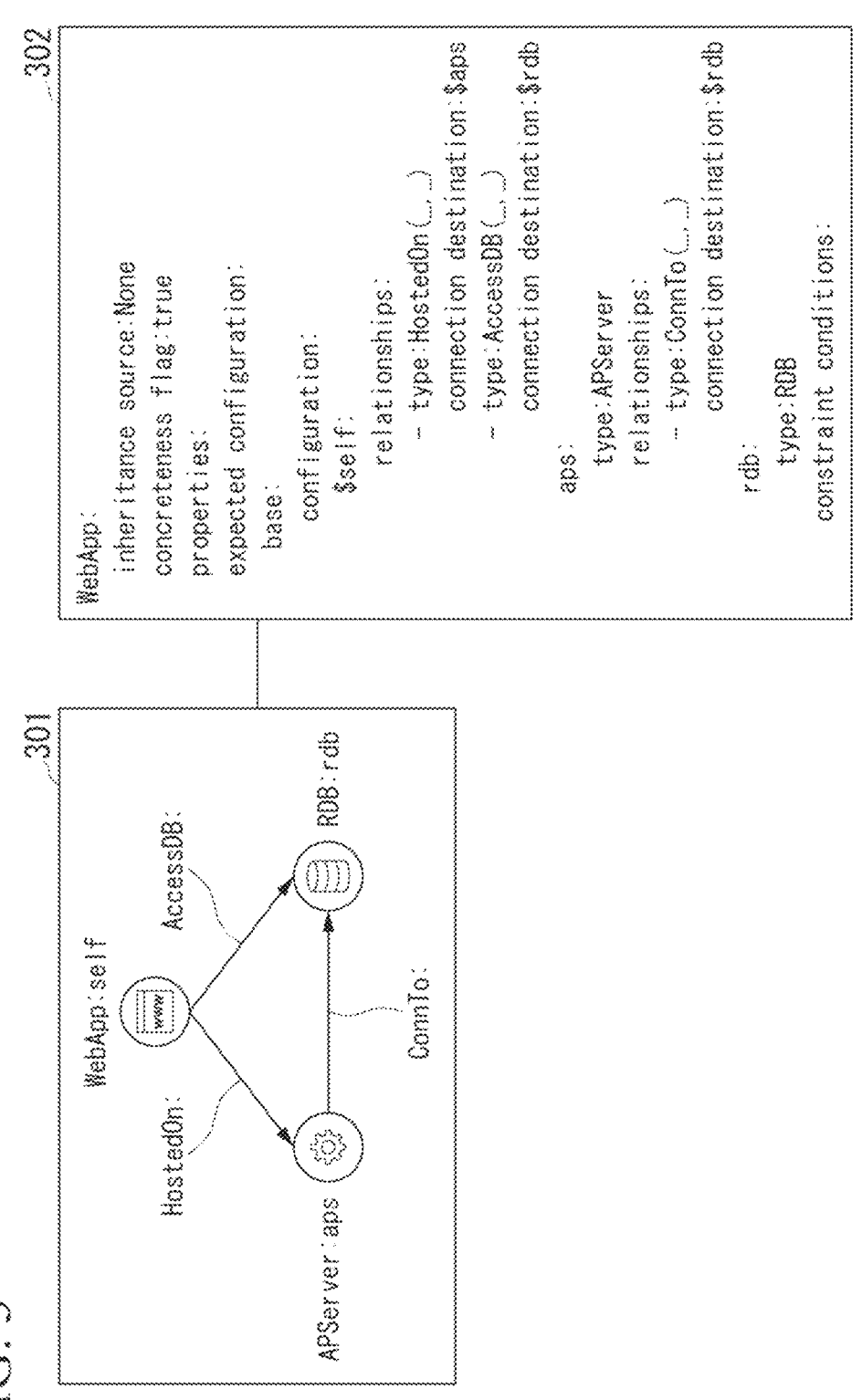
FIG. 3 is a diagram illustrating an example of type information for a configuration component.

FIG. 3 illustrates an example of configuration component type information. In FIG. 3, the left diagram 301 shows a visual representation of the configuration component type information, and the right diagram 302 shows a text-based representation. In the subsequent diagrams also, there are cases in which a diagram based on a visual representation and a diagram of a text-based representation are indicated alongside each other, and cases in which a diagram based on only one type of representation is indicated. However, explanations of whether what is illustrated is a visual representation or a text-based representation, and reference signs for the diagrams, will be omitted.

The visual representation in FIG. 3 represents a single expected configuration. The expected configuration is expressed as a partial configuration including the configuration component type itself requiring this expected configuration. In the visual representations of the type information of the configuration elements in the present description, the configuration elements themselves will be represented by configuration elements with double lines. Additionally, although a single configuration element may include multiple expected configurations, the present description will not deal with examples of type information including two or more expected configurations. Thus, the visual representations of the type information will be represented simply by single expected configurations. There will be cases in which both end types of a relationship type are omitted as appropriate.

In the text-based representation in FIG. 3, an "inheritance source", a "concreteness flag", "properties", and an "expected configuration" are each described. Since a single configuration element can include multiple expected configurations, the name of an expected configuration will be designated, and information regarding that expected configuration will be described as attributes thereof. In the example of the text representation in FIG. 3, the "base" is the name of an expected configuration. The specifics of the expected configuration represent the configuration information itself. However, the ID of the type itself being defined is described as "$self", which is a special reference name.

In the case in which both end types of a relationship type are omitted by indicating "_", the types of configuration elements at both ends designated in the definition information are used. For example, in the text representation in FIG. 3, "HostedOn (_,_)", which is the first relationship in "$self", describes the connection source as "$self" and the connection destination as "$aps". The "$self" refers to the WebApp type itself, and the type of the "$aps" is indicated to be an APServer. Thus, the full type name of this relationship is interpreted to be HostedOn (WebApp, APServer).

Other examples of configuration component type information are shown in FIG. 4. In the examples in FIG. 4, an APServer type, an RDB type, a Server type, a SmallServer type and a LargeServer type, which inherit the Server type, a Switch type, and a NormalSwitch type and a SecureSwitch type, which inherit the Switch type, are each defined.

Figure 5:
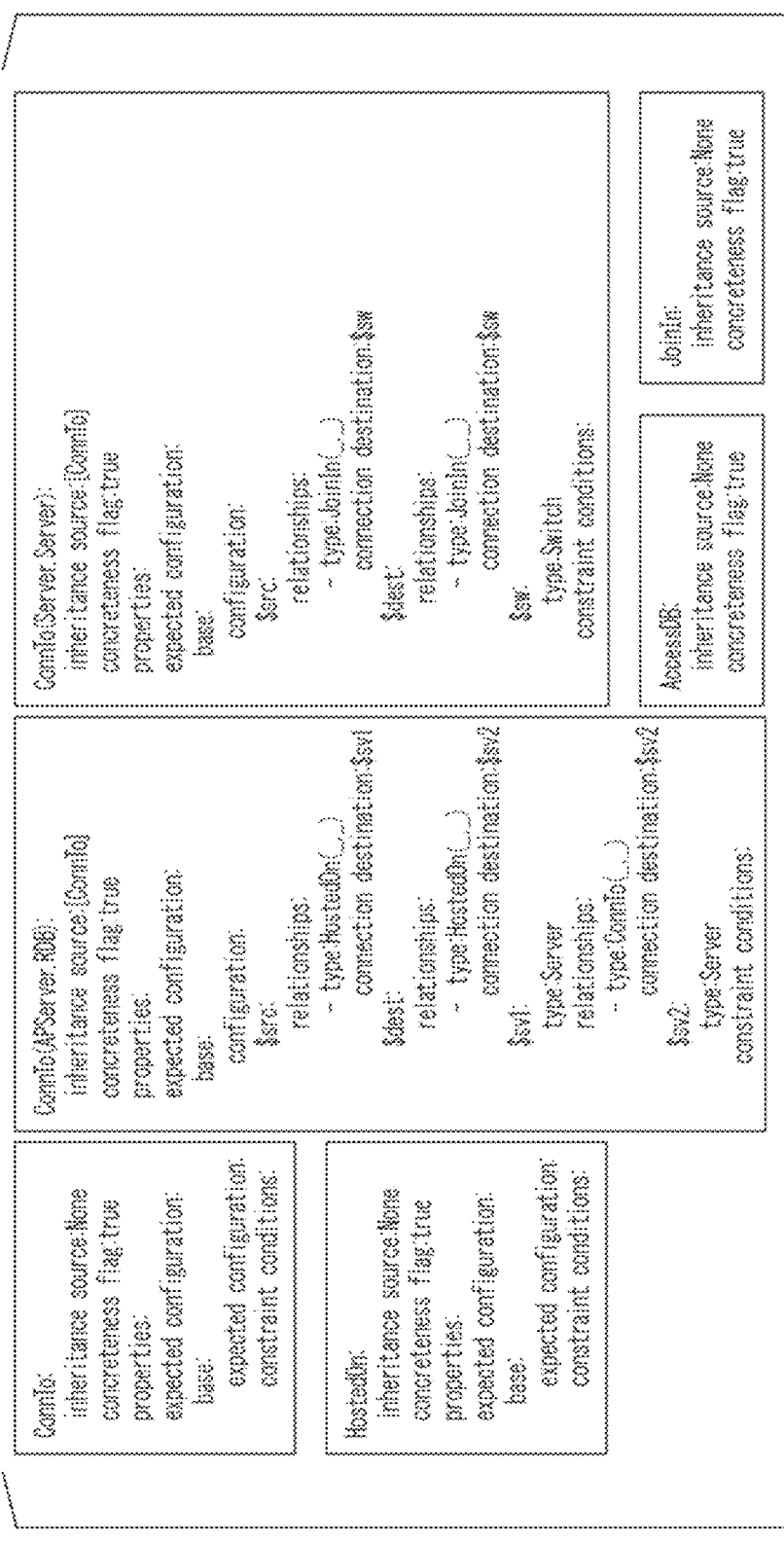
FIG. 5 is a diagram illustrating an example of type information for a relationship.

FIG. 5 illustrates an example of relationship type information. The specifics of the relationship type information are mostly the same as the specifics of the configuration component type information. However, in the expected configurations for relationship types, "$src" and "$dest" are used as special reference names in addition to "$self". In this case, "$src" represents a connection source configuration component of the relevant relationship type, and "$dest" represents a connection destination configuration component.

Figures 6A, 6B:
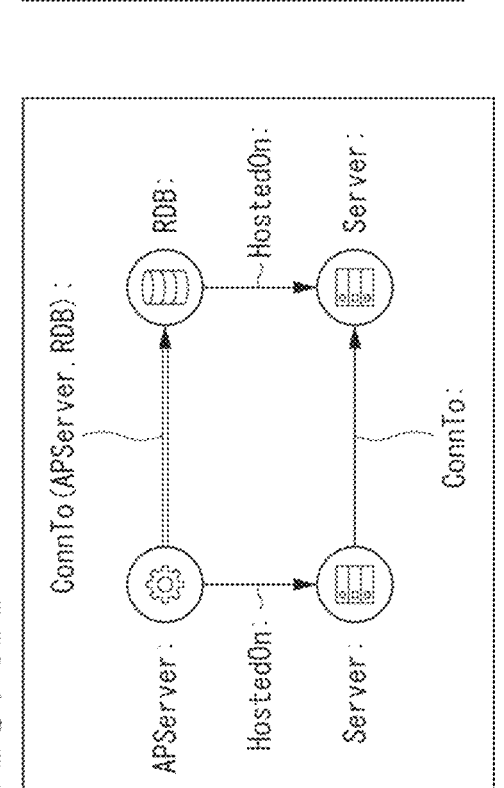
FIG. 6A is a first diagram illustrating an example of a visual representation of type information for a relationship.
FIG. 6B is a second diagram illustrating an example of a visual representation of type information for a relationship.

FIG. 6A and FIG. 6B illustrate examples of visual representations of relationship type information. In the example in FIG. 6A, a visual representation of a ConnTo (AppServer, RDB) type relationship type is indicated, and in the example in FIG. 6B, a visual representation of a ConnTo (Server, Server) type relationship type is indicated.

Figure 7:
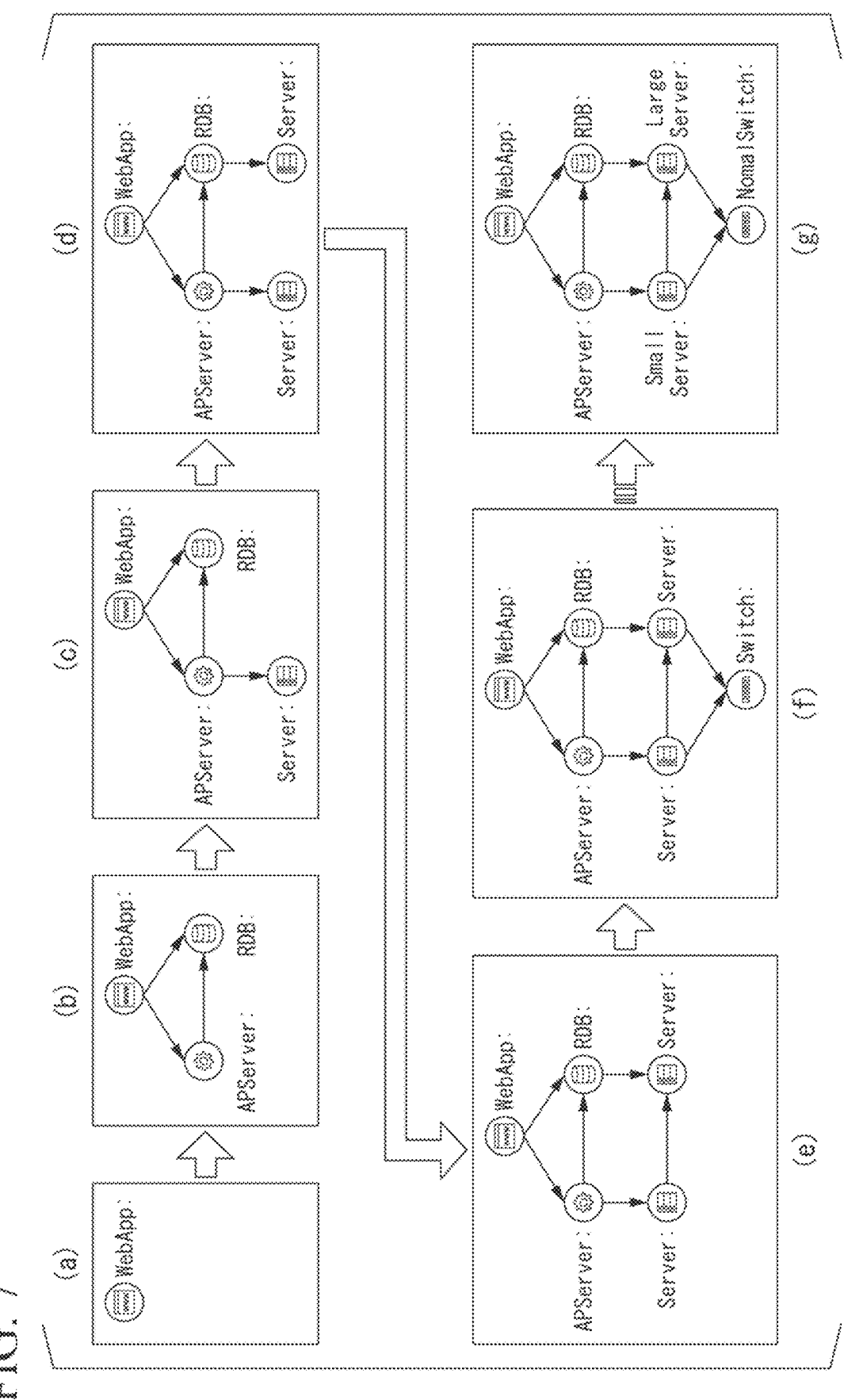
FIG. 7 is a diagram illustrating an example of design steps in automated design.

FIG. 7 illustrates an example of the design steps performed by the automated design apparatus disclosed herein. The series of configuration information from (a) to (g) in FIG. 7 indicates how the configuration information starts from system requirements, and the specifics are concretized in stages until fully concrete configuration information is finally obtained. That is, (a) is an example of system requirements, representing a request from a user wishing to construct one "WebApp". The configuration proposal in (b) is obtained by applying "base", which is an expected configuration for the WebApp type, with respect to the WebApp type configuration component in (a). Similarly, the configuration proposal in (c) is obtained by applying "base", which is an expected configuration for the APServer type, with respect to the APServer type configuration component in (b). By similar processes, (d), (e), and (f) are obtained. In the stage (f), all of the expected configurations have been completed. However, the Server types and the Switch type are not concrete types. Thus, steps are performed for replacing these with concrete types by replacement with one of extension types inheriting these types. By performing such steps three times, (g) is generated as an example.

Although FIG. 7 illustrates the design procedure as a procedure with a single path, the design procedure may actually be split into multiple branches because the expected configurations may have multiple candidates, there may be multiple candidates as extension types inheriting a certain abstract type, and which configuration elements are to be concretized first can be arbitrarily selected. The automated design apparatus 100 in the present embodiment derives concrete configuration information by following such splittable procedures in a searching manner. Data used in a general automated design apparatus not using a facet model has been explained above. Hereinafter, the data in an automated design apparatus 100 using facet models according to the present embodiment will be explained.

Figures 8, 9:
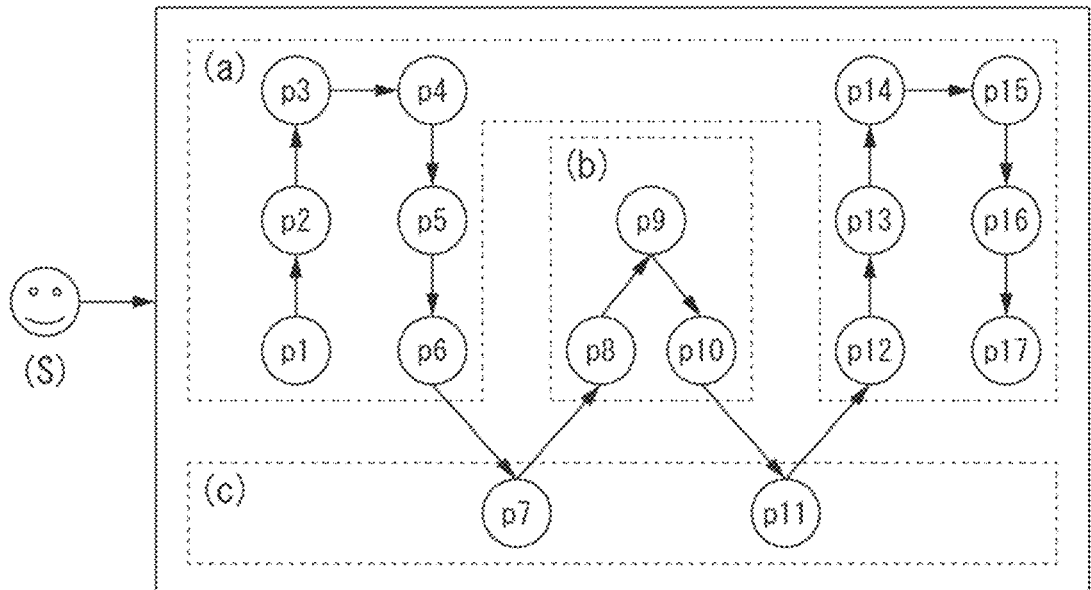
FIG. 8 is a diagram illustrating an example of system requirements.
FIG. 9 is a diagram illustrating an example of a Process Facet.

FIG. 8 is an example of system requirements that will serve as a sample for explaining automated design using the facet model in the present embodiment. The system requirements in FIG. 8 describe a configuration and constraint conditions. The constraint conditions represent conditions to be satisfied by the configuration, and satisfying the conditions described in the constraint conditions is one ending condition for the automated design search process disclosed herein. The system requirements in FIG. 8 describe only one WebApp type configuration component in the configuration portion, the specifics of which are similar to the system requirements indicated in FIG. 7 (*a*). However, three conditional expressions are further added as constraint conditions.

In this case, the first conditional expression, "TAT (configuration component: $app, service: execute)<=200", requires satisfying performance such that, when the service with the name "execute" in "$app" is called in order to execute the service, a response is returned within 200 milliseconds. In this case, "TAT" is an abbreviation for Turn Around Time, referring to the time required for a response to be returned after a certain function is called. The "TAT (configuration component: $app, service: execute)" portion is a function that returns the Turn Around Time when the service with the name "execute" in "$app" is executed. The value thereof being 200 or less is designated as the condition.

The second conditional expression, "OPT (configuration component: $app, operation: [S, R])<=60", requires that, when an operation to put the state of the "$app" in the "S" state and then to change the state to the "R" state, i.e., a restarting operation, is performed, this is required to be completed within 60 seconds. In this case, "OPT" is an abbreviation for OPeration Time, referring to the time required to perform a certain operation in the system. The "OPT (configuration component: $app, operation: [S, R])" portion is a function that returns the required time when performing operations to transition the state of the running "$app" in the order of "S" and "R", where the value thereof being 60 or less is designated as a condition. The character strings "S" and "R" representing states respectively refer to states, i.e., "S" refers to a "Stop" (stopped) state and "R" refers to a "Run" (running) state. That is, this operation represents an operation to restart an app.

The third conditional expression, "Secure ( )=true", requires that the system be secure. As mentioned below, in this case, secure means that there are no executable threats. The "Secure ( )" portion is a function that returns "true" when there are no executable threats in a configuration, and that returns "false" when there is such a threat. The value thereof being "true" is designated as a condition.

In the aforementioned examples of constraint conditions, "TAT ( )", "OPT ( )", and "Secure ( )" represent examples of functions for generating and returning expressions and values on the basis of configuration information and the facet model information mentioned below. Hereinafter, these functions will also be called a TAT function, an OPT function, and a Secure function. Additionally, these functions will be called constraint functions in the present description. The specific operations of the respective constraint functions will be described below.

These functions are implemented in advance and recorded so as to be able to be called. Additionally, these functions are examples for explaining embodiments among the present embodiments, and any constraint function different from the above may be used instead of or in addition to these examples.

In order to calculate the Turn Around Time, the TAT function may use, in addition to the configuration information, processing flow information including a chain of processes executed by the respective configuration elements. For this reason, the automated design apparatus 100 in the present embodiment concretizes processing flow facet information in parallel with the configuration information. The processing flow facet information generated in this case is referred to as a Process Facet below.

In order to calculate the Operation Time, the OPT function may use, in addition to the configuration information, information regarding state transitions occurring in the respective configuration elements. For this reason, the automated design apparatus 100 in the present embodiment concretizes state transition facet information in parallel with the configuration information. The state transition facet information generated in this case is referred to as an Operational Facet below.

In order to calculate the true/false value indicating whether or not a configuration is secure, the Secure function may use, in addition to the configuration information, information regarding threats present within the respective configuration elements. For this reason, the automated design apparatus disclosed herein concretizes threat facet information in parallel with the configuration information. The threat facet information generated in this case is referred to as a Security Facet below.

Hereinafter, Process Facets, Operational Facets, and Security Facets will be explained by providing examples thereof, as well as by indicating additional information linked to types that are required for generation thereof, and how they are concretized.

Additionally, examples regarding assessments of designs that is required using the information of these Facets will be indicated.

FIG. 9 illustrates an example of a Process Facet. A Process Facet is a model representing the flow of a series of processes for executing a certain service and the resources used to execute said service. A Process Facet comprises information regarding a request generation source, processes, the ordering relationship between the processes, resources, and the usage relationships between the processes and the resources. In FIG. 9, the circle with the face indicates the request generation source. The request generation source may hold attribute value regarding an arrival rate (i.e., the frequency of calling the service). Circles having "p" and a number inscribed therein indicate processes (i.e., computational processing). The arrows between processes indicate the ordering relationship of execution between processes, the processes being executed in the order from the bases of the arrows to the arrowheads. The boxes formed by dotted lines indicate resources, and when a process is inside a box, this means that the process uses the relevant resource. That is, the Process Facet in FIG. 9 represents a service constituted by a processing flow including of seventeen processes across three resources. As mentioned below, this example represents a concrete Process Facet for the case in which a WebApp "execute" service has been called.

FIG. 10 and FIG. 11 indicate examples of type definitions for Process Facets. The example indicated in FIG. 10 shows a definition of a Process Facet linked to the Web App type configuration component indicated in FIG. 3. The type definition of the Process Facet first indicates the elements "Type having this Facet" and "process_facet". The "Type having this Facet" is the name of the configuration element type linked to this Facet. In the example in FIG. 10, "WebApp" is designated as the "Type having this Facet". The specifics are described in the "process_facet" element. The Process Facet may be defined separately by expected configurations, and in order to do so, the names of expected configurations held by the configuration element types linked to this Facet are described. In the example in FIG. 10, "base" is the name of an expected configuration. A Process Facet mainly comprises information regarding services and resources. The definitions of services are listed in "services" and the definitions of resources are listed in "resources". In the example in FIG. 10, in addition to defining services such as "execute" and "_acceptRequest", a resource having the name "cpu_of_webApp" is also defined.

There are two types of services, i.e., composites and primitives. Composites are groups of services including other services therein, and primitives are actual processes not including other services therein. A service will always have a "composite" attribute. If the value of "composite" is "true", then "process" attributes are further included. On the other hand, if the value of "composite" is "false", then further "resources" information is included. The definition of the "process" in a composite service describes an array of information regarding the calling of other services.

In the example in FIG. 10, the "_callDb" service is a composite. In this case, the first three items in the process will be described as an example. The first service is described as "_makeDbRequest". This is a service held by the type itself, and as information regarding the calling of such services, simply the name of the service is designated. The second service is described as "$aps.sendDbRequest". This means that a service with the name "sendDbRequest", held by the configuration element referenced by "$aps", is called. In this case, "$aps" is a configuration element that is defined in an expected configuration of the WebApp type with the name "base", linked to this Process Facet (see FIG. 3). Since the configuration elements described in the expected configuration are guaranteed to be also included in a configuration proposal being designed, the services thereof can be called. In this way, the definition of a Facet can reference a configuration element in an expected configuration linked to that Facet. The third service is described as "$ ($aps, $rdb).send(10)". The "$($aps, $rdb)" portion indicates that relationships connecting the respective configuration components "$aps" and "$rdb" are referenced. Additionally, "send" is the name of a service, and the portion "(10)" thereafter indicates the value of an argument transferred to the service side when calling the service. In this example, "send" is a service for sending data, and the argument indicates that the communicated data amount is 10 MB. The "send" service is defined in the Conn (APServer, RDB) type Process Facet illustrated in FIG. 11. The "send" service holds the item "arguments" and as the first element thereof, designates that the "name" is "data amount". Thus, the service may have the attribute "arguments", and in the present specification, the elements of the respective arguments designate names for referencing the arguments. The description "@data_amount" in the definition of the same "send" service means that the value of the argument is to be referenced. In this case, the value of "data amount" is transferred, as an argument, to yet another service, and is ultimately referenced as the value of the data amount sent to the resource with the name "channel" used by the Switch type "send" service.

In the example in FIG. 10, the "_getRequestData" service is a primitive. In a service that is a primitive, information regarding the resources used and the used amount is defined. The "_getRequestData" service indicates that a "cpu" is used as a resource, and as the actual "cpu", designates the allocation of a resource referenced by "$cpu_of_webApp". As the basic processing time, the processing time for the case in which this process is executed on a CPU with standard performance is described, and in this case, the processing time is designated as being 10 milliseconds. In the example in FIG. 11, "channel" is held as a Switch type "send" service, and in this case, the data amount is described rather than the basic processing time. The values of the attributes described in the definitions of the resources are determined by the types of the resources that are referenced. As mentioned below, "cpu" references a CPU type resource and "channel" references a Communication Channel type resource.

Definition examples regarding actual resources are defined in the Server type and Switch type Process Facets in FIG. 11. The "cpu" defined in the Server type Process Facet designates that the "type" is a "CPU" resource and the attribute "relative speed" is equal to "1". Meanwhile, the "channel" defined in the Switch type Process Facet is a resource of the "Communication Channel" type, designated to have a "transfer amount per second" equal to "100". The relative speed and the transfer amount per second are each attributes representing the performance of resources. In this case, the relative speed indicates the processing speed of the CPU as a multiple with respect to that of a CPU with performance serving as a standard. The transfer amount per second indicates how many MB of data can be transferred per second. The resources defined in Process Facets other than those of the Server type and the Switch type are all defined by referring to these resources. For example, in the RDB type Process Facet, a resource is designated by direct reference by providing a description such as "$sv.cpu" as the "allocation destination".

In the visual representation in FIG. 10, the dotted line rectangles with rounded corners indicate composite services. The circles with the dotted lines represent processes for which the services of other configuration elements are referenced and for which the specifics are therefore not clear.

FIG. 12A and FIG. 12B indicate examples of derivative types of type definitions for Process Facets. In the case of the examples in FIG. 12A and FIG. 12B, SmallServer type and LargeServer type Process Facets, which are derivative types of the Server type, are defined. In these types, the value of the relative speed of the "cpu" resource is overwritten, and as a result thereof, the cpu performance difference between the SmallServer type and the LargeServer type is indicated. In the examples in FIG. 12A and FIG. 12B, the relative speed of a SmallServer type cpu is designated as "1" and the relative speed of a LargeServer type cpu is designated as "5".

Figure 13:
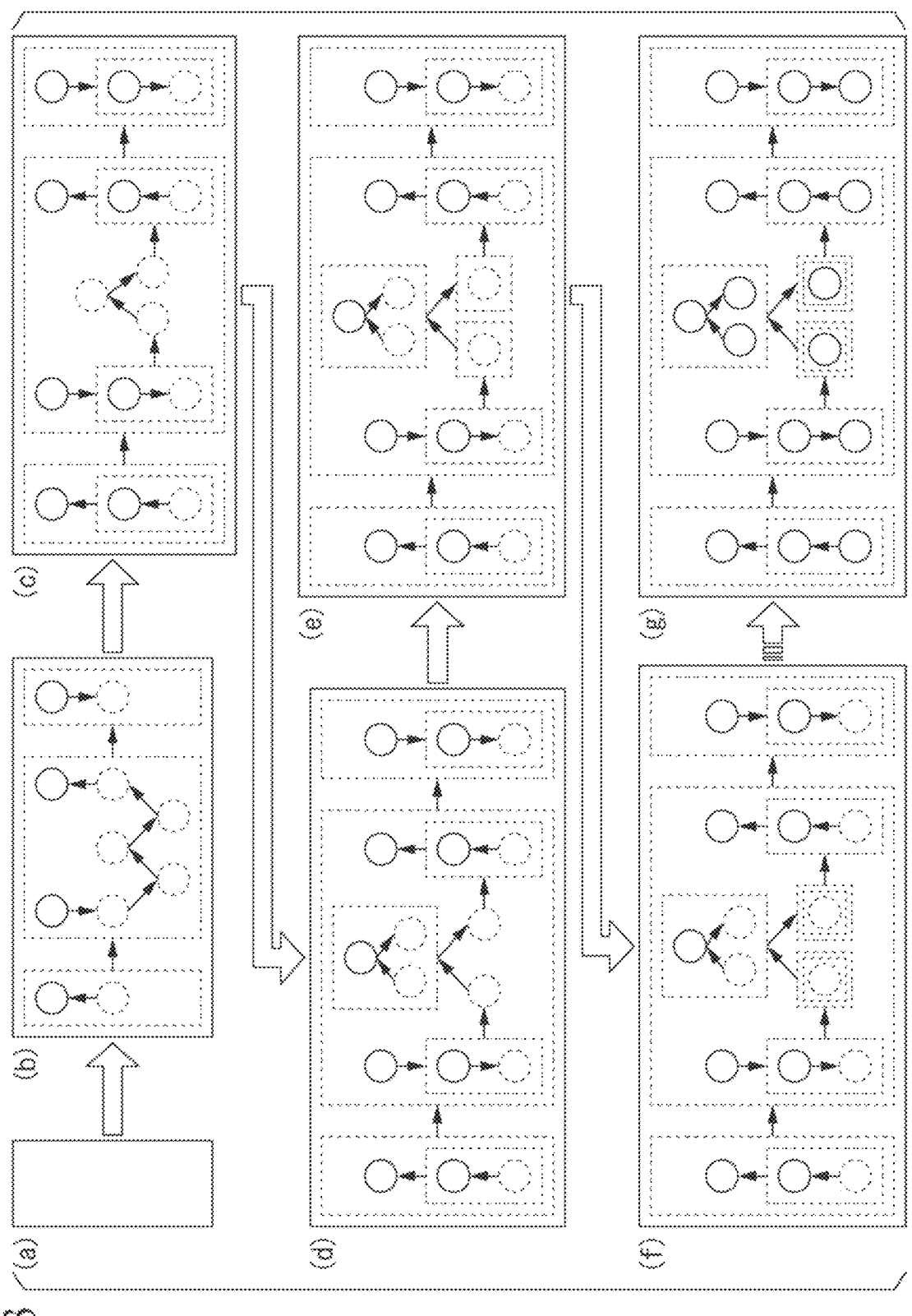
FIG. 13 is a diagram illustrating an example of a concretization step for a Process Facet.

FIG. 13 illustrates an example of a concretization procedure for a Process Facet. The Process Facet is concretized in stages, each time a configuration proposal is concretized by applying an expected configuration, by adding type definition information for the Process Facet linked to the expected configuration that has been applied. The reference symbols (a) to (g) in FIG. 13 correspond to (a) to (g) in FIG. 7. In (b), the "base" expected configuration of "$app" has been deployed. Thus, the Process Facet of the WebApp linked thereto is deployed in the periphery of the "$app". In (c), the "base" expected configuration of "$aps" has been deployed. Thus, the Process Facet of the APServer linked thereto is deployed in the periphery of "$aps". Since the illustration would become too complex, the resource information has been omitted from FIG. 13. However, the resource information is also being constantly deployed.

In this way, Facet information is defined by types corresponding to type definitions of configuration information, and actual elements are generated so as to correspond to actual elements of the configuration information. By using the Process Facet information, for example, the Turn Around Time for a specific service in a certain configuration proposal can be evaluated. The time required to execute each process can be calculated by the amount of processing requested and the performance of the resources used, and the Turn Around Time (i.e., the time required for total execution) of the service can be calculated by summing the processing times for associated processes.

In the example in FIG. 9, the "cpu" in (a) is first a cpu resource held by a Server connected to an APServer by HostedOn, and in the example of (g) in FIG. 7, a Small-Server is selected. Thus, as indicated in FIG. 12A, the relative speed is "1". Next, the "cpu" in (b) is a cpu resource held by a Server connected to an RDB by HostedOn, and in the example of (g) in FIG. 7, a LargeServer is selected. Thus, as indicated in FIG. 12B, the relative speed is "5". The "channel" in (c) is a channel resource held by a Switch connected between the aforementioned Servers, and the Switch is not defined to be overwritten in a derivative class for a Process Facet. Thus, as described for the definition of the Switch in FIG. 11, the transfer amount per second is "100".

In FIG. 9, there are twelve processes using (a), all of which have a basic processing time of "10", and the relative speed of the "cpu" is "1". Thus, the total time required for executing this portion is 10×12/1=120. Regarding the processes using (b), there are two having a basic processing time of "10" and one having a basic processing time of "200", and the relative speed of the "cpu" is "5". Therefore, the total time required for executing this portion is (10+200)/5=44. Regarding the processes using (c), there are one each for which the data amounts to be transferred are respectively "10" and "100", and the transfer amount per second of the "channel" is "100". Thus, the total time required for executing this portion is (10+100)/100=1.1. That is, the overall total is 120+44+1.1=165.1.

That is, in "TAT (element: $app, service: execute) <=200" designated as a constraint condition in the system requirements in FIG. 8, the TAT function portion becomes equal to 165.1, which is smaller than 200. Thus, it can be understood that the constraint condition is satisfied.

If SmallServer is selected as the concrete type of the Server connected to the RDB by HostedOn in the design procedure illustrated in FIG. 7, the total processing time of the processes using the resources in FIG. 9 (b) is 210, and the overall total processing time is 331.1. Thus, it can be understood that the constraint condition is not satisfied.

In the automated design procedure, when a constraint condition of a generated configuration proposal is not satisfied, this configuration proposal is discarded and a search is performed for other configuration proposals, thereby deriving a high-quality design satisfying the constraint condition. That is, a high-quality design can be derived by defining and evaluating high-level constraint conditions using the TAT function.

Each constraint condition is evaluated each time a configuration proposal is generated, thereby allowing configuration proposals that have been determined to not satisfy a condition to be discarded at an early stage and thus be pruned away. Pruning can be expected to have the effect of increasing the speed of design by eliminating unneeded searching. Since a configuration proposal that is in the midst of concretization includes some configurations that are undefined or abstract, the associated Process Facets will also be incomplete. However, the evaluation can be performed within the range for which interpretation is possible. In the configuration proposals generated during the design in the automated design apparatus disclosed herein, configuration elements basically gradually increase. Thus, the returned values of the TAT function can also be expected to increase basically monotonically. For this reason, as soon as a condition using the TAT function becomes unable to be satisfied, it can be considered to be appropriate to judge that a configuration proposal satisfying the conditions cannot be expected to be able to be obtained by further concretization, and thus to prune the configuration proposal. For, example, in the examples illustrated in FIG. 7 and FIG. 13, as soon as a SmallServer has been selected as the concrete type of the Server connected to the RDB by HostedOn, there can be considered to be cases in which any further analysis regarding concretization is omitted due to the condition becoming unable to be satisfied.

Process Facet information can be considered to be able to be used, not only for TAT, but also for similarly implementing Throughput evaluations. Thus, multiple constraint functions using a single Facet may be defined.

Figure 14:
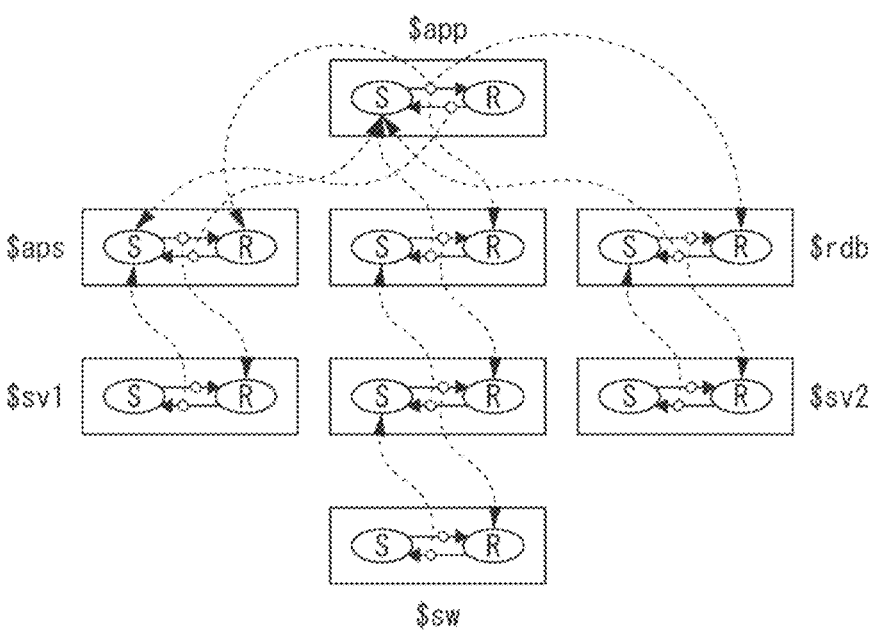
FIG. 14 is an explanatory diagram illustrating an example of an Operational Facet.

FIG. 14 illustrates an example of an Operational Facet. An Operational Facet is a model representing state transition systems of the respective configuration elements by which a certain system is configured, and dependency relationships between the state transition systems. From the Operational Facet information, a series of tasks required for a target system to transition from a certain state to another state can be derived. An Operational Facet comprises information regarding state transition systems for respective configuration elements and dependency relationships between the state transition systems. A single state transition system includes information on multiple states that a certain configuration element can be in and state transitions that can be implemented. The dependency relationships between the state transition systems are represented by specific states of one or more other configuration elements that requires to be satisfied when executing a certain state transfer in a certain configuration element.

For example, when an RDB is hosted on a certain Server, it is required that the Server has been started before in order to start the RDB. When expressing such a condition, the Server and the RDB are each assumed to be in either a stopped state or a running state, and are each assumed to be able to make mutual state transitions between the stopped state and the running state. Then, a transition of the state of the RDB from the stopped state to the running state can be defined as being dependent on the Server being in the running state.

As indicated above, the Operational Facet described in FIG. 14 visually represents a set of multiple state transition systems having dependency relationships between each other. In FIG. 14, the rectangles represent state transition systems of the respective configuration elements. The ellipses in the rectangles represent states and the solid arrows connecting ellipses with ellipses represent state transitions. The dotted arrows represent dependency relationships and are drawn from small circles on state transitions to states of other configuration elements. Near each state transition system, the ID of that state transition system is indicated in reference form. FIG. 14 illustrates an Operational Facet corresponding to the configuration information in FIG. 7 (*g*).

Figure 15:
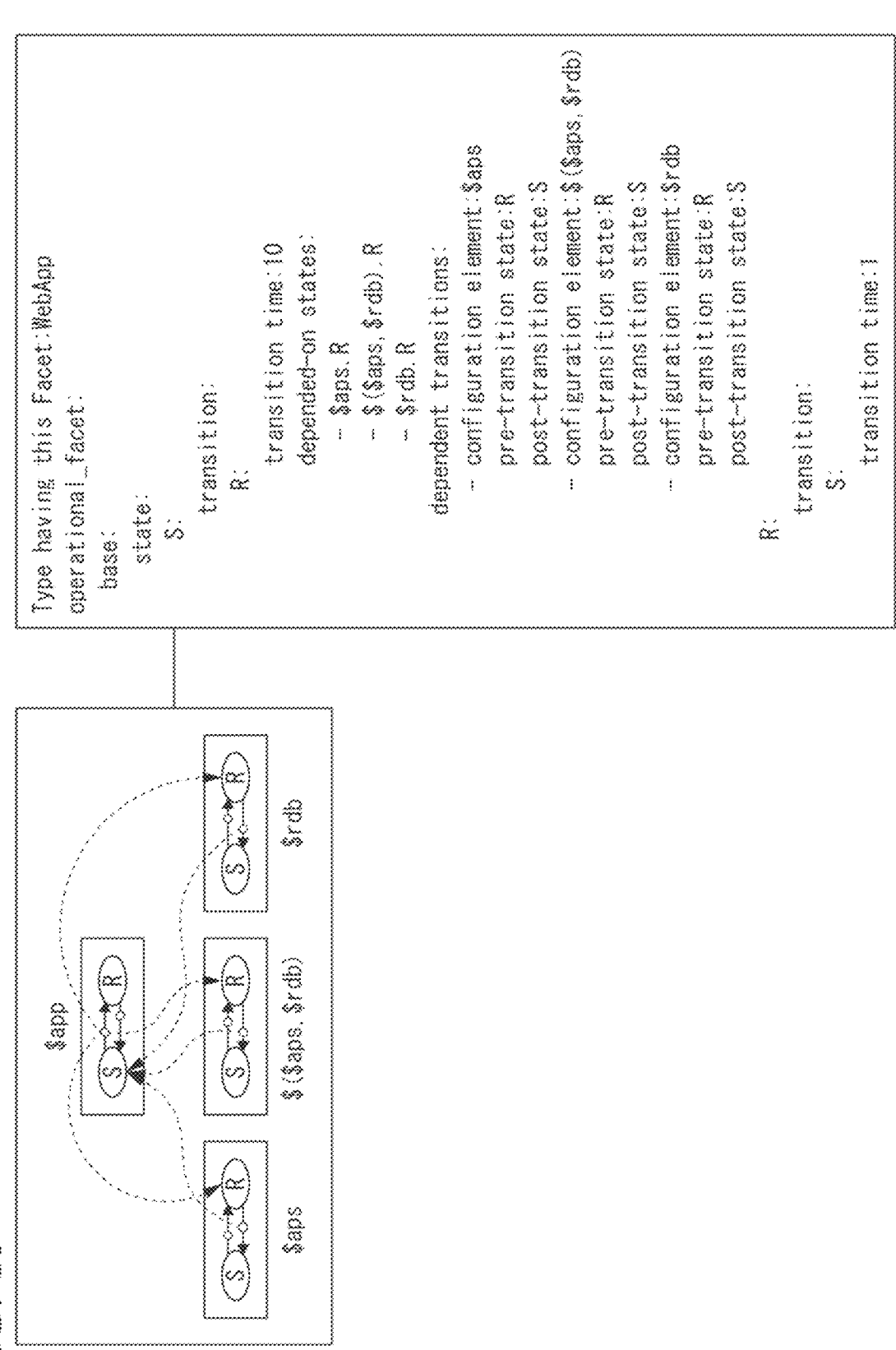
FIG. 15 is a diagram illustrating an example of a type definition for an Operational Facet.

FIG. 15 and FIG. 16 illustrate examples of type definitions of Operational Facets. FIG. 15 indicates both a visual representation and a text representation of a type definition of an Operational Facet linked to the WebApp type. FIG. 16 indicates text representations of type definitions for Operational Facets of multiple other types.

As with Process Facets, the type definition of an Operational Facet first indicates the elements "Type having this Facet" and "operational_facet". In the example in FIG. 15, a "WebApp" is designated as the "Type having this Facet". The specifics are described in the "operational_facet" element. The Operational Facet may be defined separately by expected configurations, and in order to do so, the names of expected configurations held by the configuration element types linked to this Facet are described. In the examples in FIG. 15 and FIG. 16, "base" is the name of an expected configuration. The definition of a single Operational Facet corresponding to a single expected configuration is represented by a set of definitions of "states". For each state, a "transition" and a "depended-on transitions" are described. The "transition" element first lists a post-transition state, and since each post-transition state corresponds to a single state transition, the attributes of each state transition are described therein. As the attributes of each state transition, the transition time and an array of depended-on states are described. Dependent transitions are arrays of state transitions of other configuration elements that are dependent on the state for which they are described. Each element thereof describes a configuration element, a pre-transition state and a post-transition state. The configuration elements describe IDs of configuration elements having state transitions, and the names of states are described for both pre-transition states and post-transition states.

In the example in FIG. 15, "S" and "R" are defined as the states. In the state "S", a state transition having "R" as the post-transition state is described. The state transition from "S" to "R" has a transition time of 10 and designates "$aps.R", "$($aps. $rdb).R" and "$rdb.R" as depended-on states. In this case, for example, "$aps.R" means a state "R" that a configuration element indicated by "$aps" has.

Figure 17:
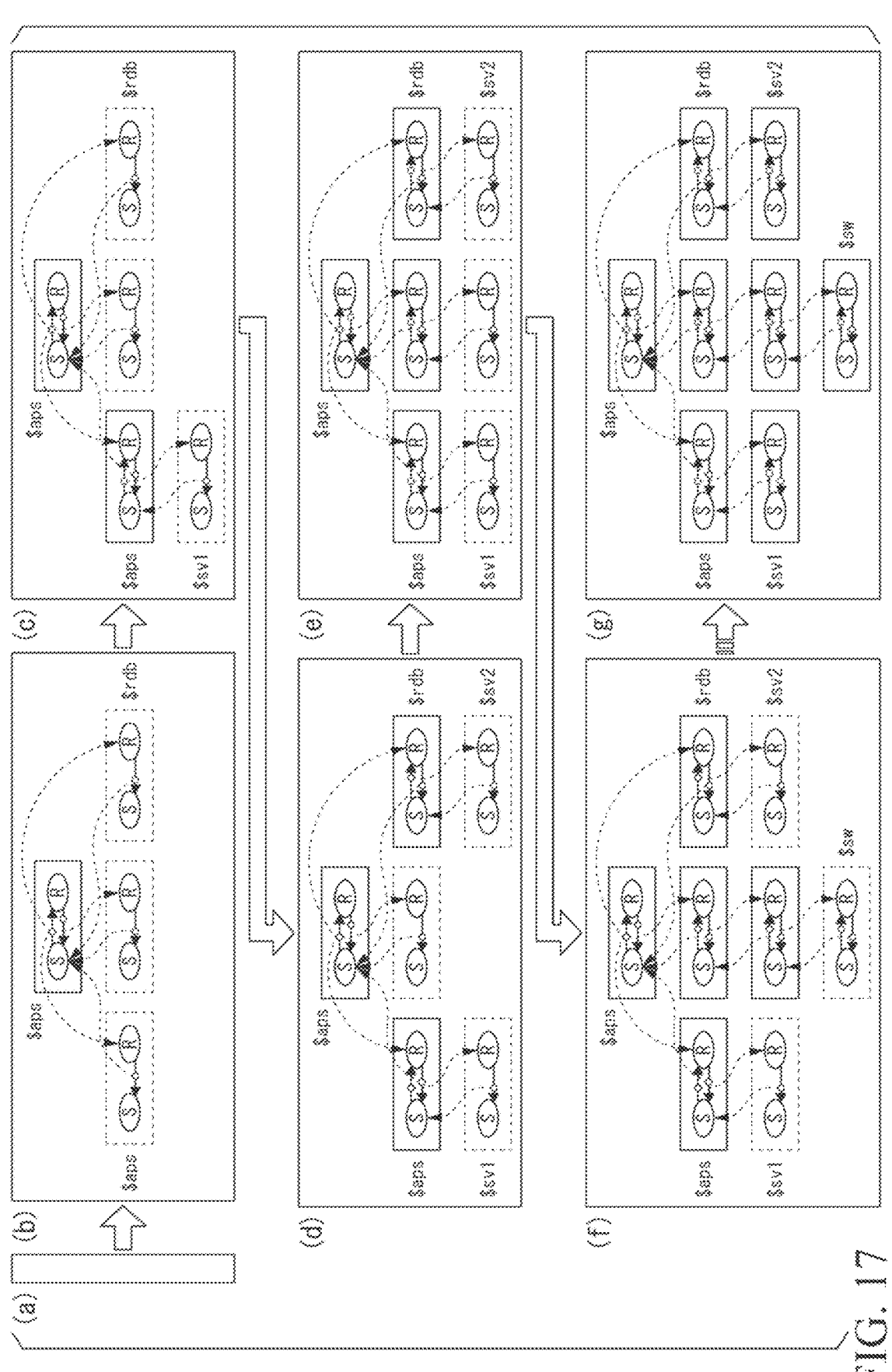
FIG. 17 is a diagram illustrating an example of a concretization process for an Operational Facet.

FIG. 17 illustrates an example of a concretization procedure for an Operational Facet. As with Process Facets, the Operational Facet is concretized in stages, each time a configuration proposal is concretized by applying an expected configuration, by adding type definition information for the Operational Facet linked to the expected configuration that has been applied. The reference symbols (a) to (g) in FIG. 17 correspond to (a) to (g) in FIG. 7. In (b), the base expected configuration of "$app" has been deployed. Thus, the WebApp Operational Facet linked thereto is deployed in the periphery of the "$app". In (c), the base expected configuration of "$aps" has been deployed. Thus, the APServer Operational Facet linked thereto is deployed in the periphery of "$aps".

By using the Operational Facet information, the time required for performing specific tasks in a certain configuration proposal, i.e., the Operation Time, can be evaluated as the time required to transition from a specific state to a specific state. For example, Japanese Unexamined Patent Application Publication No. 2015-215885 describes a method for calculating, in a state transition system as mentioned above, the possible state transition procedures to get from a current state to a specific target state. The time required for each state transition included in an obtained state transition procedure is acquired from the state transition times indicated in the type definitions of the Operational Facets, and these are summed to obtain the Operation Time.

Figures 18, 19:
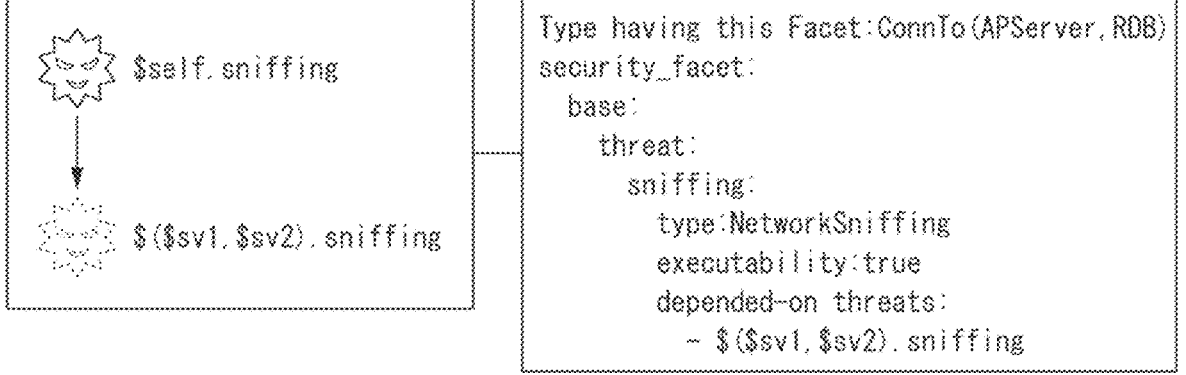
FIG. 18 is a diagram illustrating an example of a Security Facet.
FIG. 19 is a diagram illustrating an example of a type definition for a Security Facet.

FIG. 18 illustrates an example of a Security Facet. A Security Facet is a model representing threats that are intrinsic to the respective configuration elements by which a certain system is configured, and the dependency relationships between the threats. The Security Facet information can be used to derive executable attack paths in a target system, allowing for evaluation of whether or not the system is secure. A Security Facet comprises information on threats that are intrinsic to the respective configuration elements and the dependency relationships between the threats. Threats represent computer processes and work by attackers that may harm users and managers of a system. For example, such threats include eavesdropping on communications. The dependency relationships between threats are relationships such that, in order to execute a certain threat, another specific threat requires to be executed beforehand.

The Security Facet indicated in FIG. 18 visually represents a set of multiple threats having a dependency relationship with each other. In FIG. 18, a virus icon represents a single threat, and an arrow drawn from one threat to another threat represents a dependency relationship between the threats. Near each threat, a character string is indicated in which the ID of the configuration element having that threat and the name of the threat are connected by a dot (".."). FIG. 18 illustrates a Security Facet corresponding to the configuration information in FIG. 7 (g).

FIG. 19 and FIG. 20 illustrate examples of type definitions of Security Facets. FIG. 19 provides a visual representation and a text representation of a type definition for a Security Facet linked to the ConnTo (APServer, RDB) type. FIG. 20 illustrates text representations of type definitions for Security Facets of multiple other types.

As with Process Facets and Operational Facets, the type definition of a Security Facet first indicates the elements "Type having this Facet" and "security_facet". In the example in FIG. 19, a "ConnTo (APserver, RDB)" is designated as the "Type having this Facet". The specifics are described in the "security_facet" element.

The Security Facet may be defined separately by expected configurations, and in order to do so, the names of expected configurations held by the configuration element types linked to this Facet are described. In the examples in FIG. 19 and FIG. 20, "base" is the name of an expected configuration. The definition of a single Security Facet corresponding to a single expected configuration is represented by a set of definitions of "threats". First, the names of the threats are designated, and information regarding respective threats is described as attributes thereof. The information on the respective threats includes a "type", "executability" and "depended-on threats". The "type" is the species of the threat, the "executability" is a true/false value representing whether or not this threat can be executed, and the "depended-on threats" represent other threats that require to be executed in advance in order to execute this threat. In the visual representation in FIG. 19, the virus icon with the dotted line represents a threat for which another configuration element is referenced and for which the specifics are therefore not clear.

FIG. 20 defines two Security Facets linked to a NormalSwitch type and a SecureSwitch type, which are derivative types of the Switch type. The executability of "sniffing" in the NormalSwitch type Security Facet is "true". On the other hand, the executability of "sniffing" in the SecureSwitch type Security Facet is indicated as "false".

Figure 21:
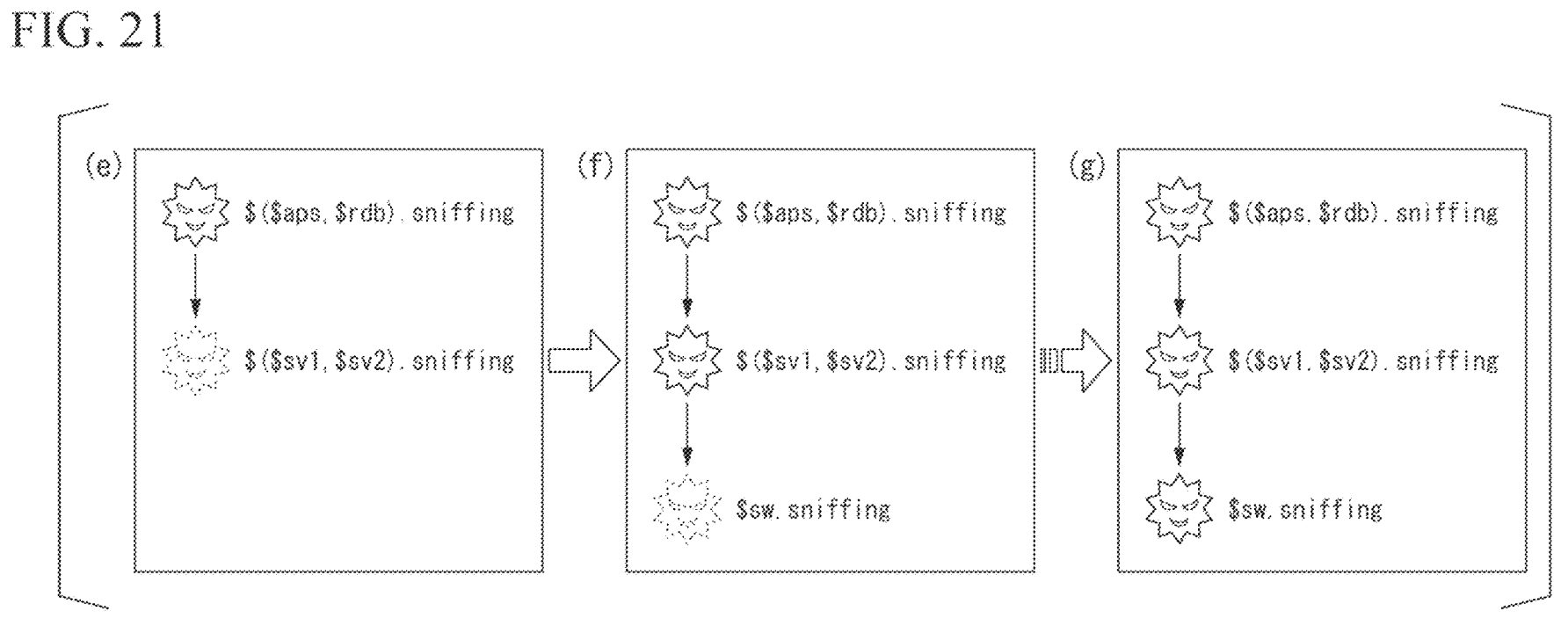

FIG. 21 illustrates an example of a concretization procedure for a Security Facet. As with Process Facets and Operational Facets, the Security Facet is concretized in stages, each time a configuration proposal is concretized by applying an expected configuration, by adding type definition information for the Security Facet linked to the expected configuration that has been applied. The reference symbols (a) to (g) in FIG. 21 correspond to (a) to (g) in FIG. 7.

By using Security Facet information, attack paths in a certain configuration proposal can be generated, allowing for evaluation of whether or not that configuration proposal is secure. An attack path refers to a pathway comprising a chain of executable attacks and dependency relationships, starting from a threat not having any particular dependencies. The Security Facet indicated in FIG. 21 (g) has an attack path starting from a "sniffing" threat on a Switch. Because there is an attack path, the configuration proposal corresponding to this Security Facet is evaluated as not being secure. In this case, in the process of generating the configuration proposals from (f) to (g) in FIG. 7, if a SecureSwitch is selected instead of a NormalSwitch when selecting the specific type of the Switch type configuration element, the executability of "sniffing" becomes "false", as indicated in FIG. 20. Thus, the attack path in FIG. 21 (g) cannot be established, and the configuration proposal is evaluated as being secure. As a result thereof, the automated design apparatus disclosed herein can selectively derive a secure system configuration by designating constraint conditions using the Secure function as a system requirement, as indicated in FIG. 8.

Operations

Next, operations of the automated design apparatus 100 of the present embodiment will be explained.

Figure 22:
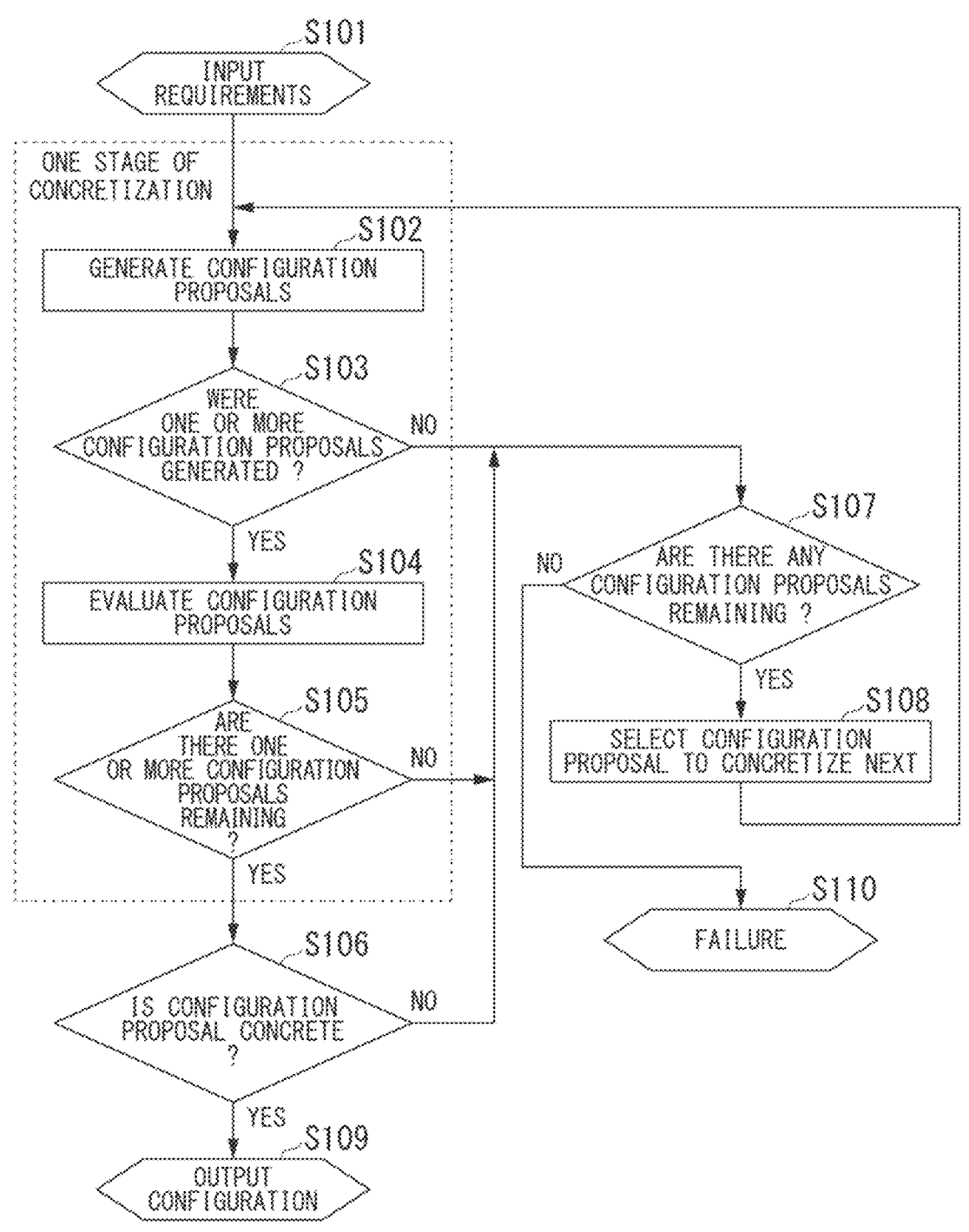
FIG. 22 is a flow chart illustrating an example of an automated design operation summary.

FIG. 22 is a flow chart indicating the operations in the automated design apparatus of the present embodiment.

First, an overall summary of the operations will be described. Initially, the configuration search unit 111 receives inputs of system requirements from a user terminal, which is not illustrated, via an input/output unit, which is not illustrated (S101). Next, the configuration search unit 111, etc. repeatedly executes processes (S102 to S108) for concretizing the system requirements in stages, and outputs a fully concretized system configuration to the user terminal via the input/output unit, which is not illustrated (S109).

More specifically, the configuration proposal generation unit 112 generates concrete configuration proposals (S102), and determines whether or not one or more configuration proposals have been generated (S103). If one or more configuration proposals have been generated (S103: Y), the configuration proposal evaluation unit 113 evaluates the configuration proposals (S104). The configuration proposal evaluation unit 113 evaluates whether or not the concrete configuration proposals generated by the configuration proposal generation unit 112 satisfy system requirements, and returns the evaluation results to the configuration search unit 111. Next, the configuration search unit 111 determines whether or not one or more configuration proposals for which an evaluation result that the system requirements and constraint conditions are satisfied have been generated (S105). If one or more configuration proposals have been generated (S105: Y), then the procedure advances to S106. If one or more configuration proposals have not been generated (S103 or S105: N), then the procedure advances to S107.

The configuration search unit 111, etc., when performing the concretization in stages, first implements the one stage of concretization (S102 to S105) described above, and checks whether the multiple configuration proposals that have been obtained include a concrete configuration proposal (S106). A configuration proposal is judged to be concrete when all of the configuration elements included therein are complete and all of the constraint conditions are satisfied. Whether each configuration element is complete is judged by whether or not the concreteness flag of that type is "true" and expected configurations are satisfied. The information regarding configuration element types required for judging whether a configuration proposal is complete is stored in the model information storage unit 130, and the configuration proposal generation unit 112 and the configuration proposal evaluation unit 113 in the configuration concretization unit 110 read out this information from the model information storage unit 130. If a concrete configuration proposal is included (S106: Y), then the configuration search unit 111 outputs that concrete configuration proposal as the design result system configuration (S109). If a concrete configuration proposal is not included (S106: No), then the configuration search unit 111 checks whether other abstract configuration proposals remain among configuration proposals awaiting concretization (S107). If an abstract configuration proposal remains (Yes in S107), then the configuration search unit 111 appropriately selects the next configuration proposal to be concretized (S108) and re-implements one state of concretization. If there are no configuration proposals remaining (S107: No), then the configuration search unit 111 cannot further analyze any designs, and the process ends in failure (S110).

Explaining one stage in the concretization process in detail, the configuration proposal generation unit 112 first generates multiple configuration proposals for the system requirements input in S101, or for a configuration proposal that has been selected to concretize next in S108, by performing operations for applying expected configurations that can be applied, or for replacing abstract types with derivative types thereof (S102). The information on configuration element types required for generating configuration proposals is stored in the model information storage unit 130, and the configuration proposal generation unit 112 reads this information out from the model information storage unit 130. Then, the configuration search unit 111 checks whether or not one or more configuration proposals have actually been generated (S103). If a configuration proposal has not been generated (S103: N), then the first stage of concretization has failed, and thus, the configuration proposal generation unit 112 advances to concretization of another configuration proposal among the configuration proposals that are awaiting concretization (S107). If one or more configuration proposals have been generated (S103: Y), then the configuration search unit 111 transfers the respective configuration proposals that have been generated to the configuration proposal evaluation unit 113, and receives evaluation results (S104). The configuration element type information (particularly information regarding constraint conditions) required for evaluating configuration proposals is stored in the model information storage unit 130, and the configuration proposal evaluation unit 113 reads this information out from the model information storage unit 130. The configuration search unit 111 selects a configuration proposal to be concretized next based on the evaluation results provided for each configuration proposal (S108).

Figure 23:
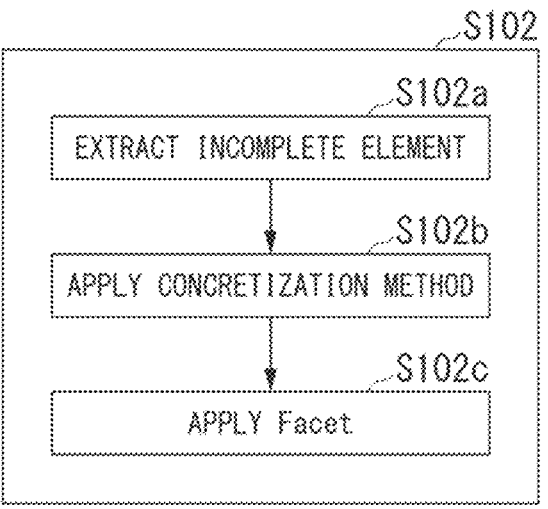
FIG. 23 is a first flow chart illustrating an example of the detailed operations in an automated design apparatus.

FIG. 23 is a flow chart indicating the specific operations of the automated design apparatus of the present embodiment.

In FIG. 23, in particular, the specifics of configuration proposal generation (S102) will be explained so as to include the operations of the facet model concretization unit 120.

During configuration proposal generation (S102), the configuration concretization unit 110 first extracts an incomplete configuration element from among configuration proposals to be concretized (S102a). Next, the configuration concretization unit 110 performs a type replacement or applies an expected configuration to each of the incomplete configuration elements that have been extracted, thereby generating a configuration proposal in which one stage has been concretized (S102b). Type replacement can be implemented in the case in which the type of a target configuration element is an abstract type. By replacement with respective derivative types, as many different configuration proposals are generated as there are derivative types. The application of an expected configuration is possible when expected configurations are not satisfied for configurations in the periphery of a target configuration element. By applying each expected configuration, as many different configuration proposals are generated as there are species of expected configurations. Next, the configuration concretization unit 110 transmits information regarding the configuration proposals generated by applying the expected configurations and identification information for the expected configurations that have been applied (sets of configuration element IDs and names of expected configurations) to the facet model generation unit 121, acquires various species of Facet information from the facet model generation unit 121, and applies this information to the configuration proposals (S102c). The facet model generation unit 121, upon receiving the configuration proposals and the expected configuration identifiers from the configuration concretization unit 110, acquires relevant type information from the model information storage unit 130 based on the configuration element type names designated by the identifiers, acquires the respective species of Facet information linked the expected configurations with the names designated by the identifiers, updates the information of the respective Facet information in accordance with the Facet application methods for each species, and returns the information to the configuration concretization unit 110.

Figure 24:
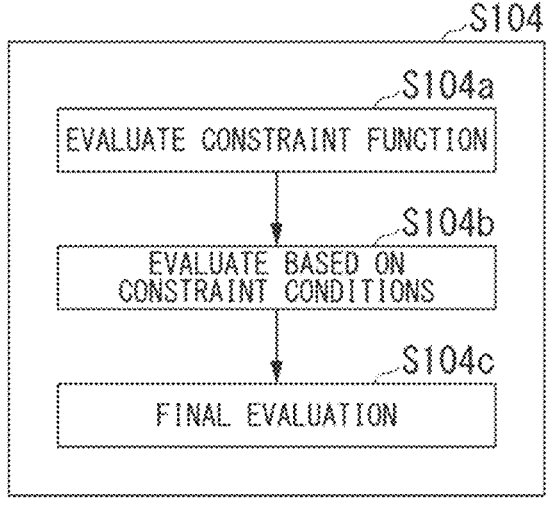
FIG. 24 is a second flow chart illustrating an example of the detailed operations in an automated design apparatus.

FIG. 24 is a flow chart indicating the specific operations of the automated design apparatus of the present embodiment.

In FIG. 24, the specifics of configuration proposal evaluation (S104) will be explained so as to include operations of the facet model concretization unit 120.

In configuration proposal evaluation (S104), the configuration proposal evaluation unit 113 first transmits configuration proposals and constraint functions including constraint conditions provided on the configuration proposals to the facet model evaluation unit 122, and acquires evaluation values of the functions from the facet model evaluation unit 122 (S104a). The facet model evaluation unit 122 receives the evaluation values of the respective constraint functions from the configuration proposal evaluation unit 113 and replaces portions of the constraint condition functions with the evaluation values, thereby updating the specifics by which expressions can be evaluated, then evaluating whether all of the constraint conditions are satisfied (S104b). For example, as explained with reference to FIG. 9 to FIG. 11, the facet model evaluation unit 122 generates evaluation expressions for calculating processing times, calculates the processing times (TAT), and evaluates whether or not the constraint conditions (for example, being equal to or less than 200) are satisfied with the calculated processing times as the evaluation values. The configuration proposal evaluation unit 113 finally evaluates whether or not a configuration proposal is effective from information such as whether constraint conditions are satisfied (S104c). When making the final evaluation, the configuration proposal can be evaluated by using yet another method. For example, the configuration proposal may be evaluated based on a statistical assessment based on evaluation values from past design results, using AI (artificial intelligence), etc.

Effects

In order to appropriately evaluate the performance and availability of a system, for example, information from various facets is required, such as the processing flow when executed and the task flow to be implemented at the time of a malfunction. More specifically, for example, in order to accurately estimate the time (to be described, hereinafter, as TAT, as an abbreviation for Turn Around Time) required from when a function of the system is called until an output result is obtained, computations, which is made by calculating and summing the time required to execute each functional block are required, while considering the manner in which the respective processing blocks included in the processing flow are connected, the amount of resources allocated to the respective processing blocks, etc., Alternatively, in order to accurately estimate the time (to be described, hereinafter, as RTO, as an abbreviation for Recovery Time Objective) required until recovery when a malfunction has occurred in the system, computations are required to be made by deriving the specifics of a series of malfunction recovery tasks based on information such as the operations to be performed on each component affected by the malfunction, the dependency relationships between the operations, the time required for each operation, etc., and by summing the time required for each of the tasks that are included. For this reason, with general technology, it is hard to accurately evaluate the suitability of configuration proposals in the midst of concretization based on general standards such as performance and availability, and high-quality designs are difficult to derive. Meanwhile, when attempting to introduce information from various facets, as mentioned above, the species and number of configuration components included in the configuration proposals significantly increase, complicating the specifics and making them difficult for people to understand, and also causing a problem in that considerable time is required to derive concrete system configurations due to the complexity of search processes at the time of design.

In contrast therewith, according to the present embodiment, with respect to type definitions, which are information describing the properties of each species of configuration component from a configuration facet, definitions of models for facets other than the configuration facet, described so as to be associated with yet separate from the configurations, are received as additional information. Furthermore, at the time of the design process, configuration information and models for each facet are recorded in a divided manner so as to be easily distinguishable, and the models for each facet are concretized in parallel with the concretization of the configuration information.

Additionally, in a process for calculating evaluation information for a configuration proposal, evaluation values are calculated by referencing required models from other facets as appropriate. Thus, information from diverse facets required for evaluating configuration proposals for a system (for example, evaluations of requests relating to TAT, RTO, security, etc.) can be defined so as to be easily understandable for people, and search processes by an automated design apparatus 100 can be incorporated in an efficiently executable form, thereby allowing high-quality system configurations to be automatically designed efficiently and in a short time. For example, highly accurate evaluations of design proposals can be realized and the quality of designs can be improved by introducing information from various facets other than configuration information in a manner allowing the information to be referenced during the automated design process. Additionally, by introducing information in a divided manner so that information other than configuration information does not need to be referenced when generating configuration proposals, complexification of the search process at the time of design can be avoided, and increases in the time required to derive concrete system configurations can be largely avoided. Additionally, even regarding type definition information, since the definitions can be divided for each facet, complexification of the specifics can be avoided and they can be kept from becoming difficult for people to understand.

In the embodiment described above, the three models of processing processes, tasks required for operation, and attack processes that are potential threats were given as examples of facet models. However, the facet models are not limited thereto, and the models may be for evaluating systems from other facets. Additionally, the specifics of the respective facet models such as processing processes are also not limited to those indicated for the above-mentioned embodiment (for example, in FIG. 9, FIG. 14 and FIG. 18).

(Minimum Configuration)

Figure 25:
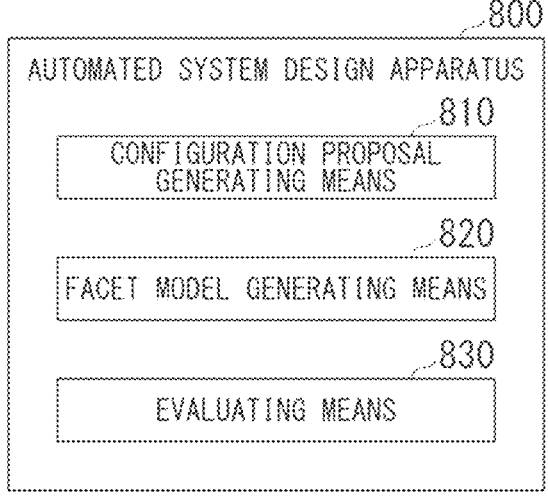
FIG. 25 is a block diagram illustrating a minimum configuration example of an automated system design apparatus.

FIG. 25 is a block diagram illustrating a minimum configuration example of an automated system design apparatus.

The automated system design apparatus 800 comprises a configuration proposal generating means 810, a facet model generating means 820, and an evaluating means 830. The configuration proposal generating means 810 generates a configuration proposal for a system concretized from requirements for the system. The facet model generating means 820 concretizes a model relating to a feature, the feature being required in the system from a facet other than a configuration of the system. The evaluating means 830 generates information required for evaluation of the configuration proposal based on the concretized model, and evaluates the configuration proposal based on the information.

The configuration proposal generating means 810 may, for example, be realized by using the functions of the configuration concretization unit 110. The facet model generating means 820 may be realized by using the functions of the facet model generation unit 121. The evaluating means 830 may, for example, be realized by using the functions of the facet model evaluation unit 122. The automated system design apparatus 800 is an apparatus that automatically designs concrete system configurations so as to satisfy provided system requirements, and in particular, realizes efficient automated design of high-quality system configurations, while introducing information from various facets other than the configuration, such as the processing flow at the time of execution and the tasks to be performed at the time of a malfunction, which is required for accurately evaluating configuration proposals in systems being designed, by preventing complexification of work for inputting this information and search processes at the time of design.

Figure 26:
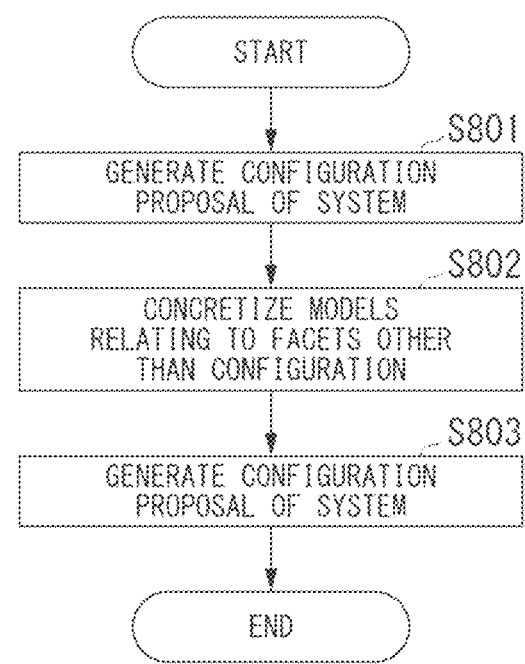
FIG. 26 is a flow chart of an automated system design method having the minimum configuration.

FIG. 26 is a flow chart of an automated system design method having the minimum configuration.

The configuration proposal generating means 810 generates a configuration proposal for a system concretized from requirements for the system (S801). The facet model generating means 820 concretizes a model relating to a feature, the feature being required in the system from a facet other than a configuration of the system (S802). The evaluating means 830 generates information required for evaluation of the configuration proposal based on the concretized model, and evaluates the configuration proposal based on the information (S803).

The automated design apparatus 100 and the automated system design apparatus 800 in the above-described embodiments may partially be realized by computer. In that case, programs for realizing the functions thereof may be recorded on a computer-readable recording medium, and the functions may be realized by reading the programs recorded on this recording medium into a computer system, and executing the programs. The "computer system" mentioned here refers to a computer system in the automated design apparatus 100 or the automated system design apparatus 800, including an OS (Operating System) and hardware such as peripheral devices.

Additionally, "computer-readable recording medium" refers to a portable medium such as a flexible disk, a magneto-optic disk, a ROM, or a CD-ROM, or to a storage device such as a hard disk in the computer system. Furthermore, the "computer-readable recording medium" may include media that dynamically hold the programs for a short time, such as communication wires in the case in which the programs are sent via a network such as the internet or communication lines such as telephone lines, and media that hold the programs for a certain period of time, such as volatile memory in computer systems that serve as servers or clients in such cases. Additionally, the above-mentioned programs may be for realizing just some of the aforementioned functions, and further may be realized in combination with programs already recorded in computer systems having the aforementioned functions.

Additionally, some or all of the automated design apparatus 100 and the automated system design apparatus 800 in the embodiments described above may be realized in the form of integrated circuits such as LSI (Large-Scale Integration). A processor may be separately formed for each of the functional units in the automated design apparatus 100 and the automated system design apparatus 800, or they may be partially or fully integrated into a processor. Additionally, the method of forming the integrated circuit is not limited to LSI, and it may be realized by a dedicated circuit or a general-purpose processor. Additionally, in the case in which technology for forming integrated circuits replacing LSI is introduced by progress in semiconductor technology, integrated circuits based on said technology may also be used.

While embodiments of the present disclosure have been described in detail with reference to the drawings above, the specific configurations are not limited to those described above, and various design changes, etc. are possible within a scope not departing from the spirit of this disclosure. Additionally, various modifications to the embodiments in the present disclosure are possible within the scope indicated in the claims, and embodiments obtained by appropriately combining technical means disclosed respectively in different embodiments are also included within the technical scope of the present disclosure. Additionally, configurations in which elements that are described in the respective embodiments or modified examples described above are replaced with elements providing similar effects are also included.

While some embodiments according to the present disclosure have been described above, all of these embodiments were presented as examples and are not intended to limit the scope of the disclosure. These embodiments may be implemented in various other forms, and various omissions, substitutions, and changes can be made within a range not departing from the spirit of the disclosure. These embodiments and modifications thereof are included within the scope and the spirit of the disclosure, and are likewise included within the scope recited in the claims and within the range of equivalents thereof.

As mentioned above, Patent Document 1 does not disclose the feature of evaluating configuration proposals in the midst of concretization. According to the present disclosure, for example, system configurations can be automatically designed while evaluating configuration proposals in the midst of concretization, generated by automated design technology, from facets other than the configuration.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

Appendix

The whole or part of the example embodiments disclosed above can be described in the embodiments can be understood, for example, as indicated below, yet they are not limited to the following.

(1) An automated system design apparatus according to a first embodiment comprises configuration proposal generating means for generating a configuration proposal for a system concretized from abstract requirements for the system; facet model generating means for concretizing a model relating to a feature, the feature being required in the system from a facet other than a configuration of the system; and evaluating means for generating information required for evaluation of the configuration proposal based on the concretized model, and for evaluating the configuration proposal based on the information.

(2) An automated system design apparatus according to a second embodiment is the automated system design apparatus according to (1), further comprising searching means for searching for a configuration proposal of the system that is highly evaluated and that is fully concretized by repeatedly performing generation of a configuration proposal by the configuration proposal generating means, concretization of the model by the facet model generating means, and evaluation of the configuration proposal by the evaluating means.

(3) An automated system design apparatus according to a third embodiment is the automated system design apparatus according to either (1) or (2), wherein the model is a model of processing processes executed by the system.

(4) An automated system design apparatus according to a fourth embodiment is the automated system design apparatus according to any one of (1) to (3), wherein the model is a model of task processes for operating the system.

(5) An automated system design apparatus according to a fifth embodiment is the automated system design apparatus according to any one of (1) to (4), wherein the model is a model of attack processes that are potential threats to the system.

(6) An automated system design apparatus according to a sixth embodiment is the automated system design apparatus according to any one of (1) to (5), wherein the feature required in the system from a facet other than the configuration of the system is any one of a feature relating to processing time in the system, a feature relating to time required for recovery of the system, and a feature relating to security in the system.

(7) An automated system design method according to a seventh embodiment is an automated system design method wherein a computer performs processes for generating a configuration proposal for a system concretized from abstract requirements for the system; concretizing a model relating to a feature, the feature being required in the system from a facet other than a configuration of the system; and generating information required for evaluation of the configuration proposal based on the concretized model, and evaluating the configuration proposal based on the information.

(8) A program according to an eighth embodiment is a program for making a computer execute processes for generating a configuration proposal for a system concretized from abstract requirements for the system; concretizing a model relating to a feature, the feature being required in the system from a facet other than a configuration of the system; and generating information required for evaluation of the configuration proposal based on the concretized model, and evaluating the configuration proposal based on the information.

What is claimed is:

1. An automated system design apparatus comprising:
at least one memory configured to store instructions; and
at least one processor configured to execute the instructions to:
  generate, from abstract requirements for a system including multiple configuration components that make up the system and a relationship between the multiple configuration components, configuration information including a configuration proposal for the system concretized, by replacing a configuration component with another configuration component or adding the configuration component;
  concretize a model of the configuration proposal by updating the model using model information relating to a feature, which is associated with each of multiple configuration components of the concretized configuration proposal and indicates a constraint condition required in the system from a facet other than a configuration of the system, the feature being at least one of processing time in the system, time required for recovery of the system, and security in the system;
  generate information required for evaluation of the configuration proposal based on the concretized model, and for evaluating whether the configuration proposal satisfies or not the constraint condition based on the information; and
  reference the information without referencing the configuration information; or
  reference the configuration information without referencing the information.

2. The automated system design apparatus according to claim 1,
wherein the at least one processor is configured to execute the instructions to:
search for the configuration proposal of the system that satisfies the constraint condition and that is fully concretized by repeatedly performing generation of the configuration proposal, concretization of the model, and evaluation for determining whether the configuration proposal satisfies or not the constraint condition.

3. The automated system design apparatus according to claim 2,
wherein the at least one processor is further configured to execute the instructions to:
  generate a plurality of configuration proposals that have been concretized one stage; and
  concretize, one stage, the model of each of the plurality of configuration proposals,
  in searching for the configuration proposal by repeatedly performing the generation of the configuration proposal and concretization of the model in stage, exclude a configuration proposal that does not satisfy the constraint condition in the evaluation among the plurality of configuration proposals, from being a subject for performing the generation of the configuration proposal and concretization of the model in a next concretization stage.

4. The automated system design apparatus according to claim 1, wherein:
the constraint condition indicates the feature of the processing time in the system;
the model is a model of processing processes, including a series of processes executed by the system, and that includes resource information, including a time required to execute a process, for each of configuration components included in the processing processes executed according to the configuration proposal.

5. The automated system design apparatus according to claim 4,
wherein the at least one processor is further configured to execute the instructions to:
  calculate the processing time for the series of processes indicating a Turn Around Time of a service according to the configuration proposal, based on the resource information;
  determine whether the configuration proposal satisfies the constraint condition or not, based on the Turn Around Time of the service.

6. The automated system design apparatus according to claim 5,
wherein the processing time for the series of processes increases as a number of the multiple configuration components increases with the concretization of the configuration proposals.

7. The automated system design apparatus according to claim 1, wherein:
the constraint condition indicates the feature of the time required for recovery of the system;
the model is a model of task processes for operating the system, and that includes information on a state transition occurring in each of configuration components of the configuration proposal, a dependency relationship between state transitions, and a time required for the state transition.

8. The automated system design apparatus according to claim 7,
wherein the at least one processor is further configured to execute the instructions to:
  derive a sequence of tasks required for the recovery of the system according to the configuration proposal, based on the dependency relationship between state transitions, and calculate a time required for the recovery of the system, based on the time required for the state transition; and
  determine whether the configuration proposal satisfies or not the constraint condition, based on the time required for the recovery of the system.

9. The automated system design apparatus according to claim 1, wherein:
the constraint condition indicates the feature of the security in the system;
the model is a model of attack processes that are potential threats to the system, and that includes a dependency relationship between threats within each of configuration components of the configuration proposal.

10. The automated system design apparatus according to claim 9,
wherein the at least one processor is further configured to execute the instructions to:

determine whether an attack path indicating a chain of executable attacks exists or not in the configuration proposal, based on the dependency relationship between threats; and determine that the configuration proposal does not satisfy the constraint condition, in a case where there is the attack path.

11. The automated system design apparatus according to claim 1, wherein the at least one processor is further configured to execute the instructions to:

receive system requirement information from a terminal via an input/output circuitry:

generate the configuration proposal by converting the abstract requirements for the system into the configuration proposal; and output the configuration proposal, into which the abstract requirements has been converted, to the terminal via the input/output circuitry in a case where the configuration proposal satisfies the constraint condition.

12. The automated system design apparatus according to claim 1, wherein the at least one memory is configured to store information related to the feature indicating the constraint condition separately from a definition of the configuration component, while being associated with the configuration component.

13. An automated system design method executed by a computer, the automated system design method comprising:

generating, from abstract requirements for a system including multiple configuration components that make up the system and a relationship between the multiple configuration components, configuration information including a configuration proposal for the system concretized, by replacing a configuration component with another configuration component or adding the configuration component;

concretizing a model of the configuration proposal by updating the model using model information relating to a feature, which is associated with each of multiple configuration components of the concretized configuration proposal and indicates a constraint condition required in the system from a facet other than a configuration of the system, the feature being at least one of processing time in the system, time required for recovery of the system, and security in the system;

generating information required for evaluation of the configuration proposal based on the concretized model, and evaluating whether the configuration proposal satisfies or not the constraint condition based on the information; and referencing the information without referencing the configuration information; or referencing the configuration information without referencing the information.

14. A non-transitory computer-readable storage medium that stores a program for making a computer execute processes, the processes comprising:

generating, from abstract requirements for a system including multiple configuration components that make up the system and a relationship between the multiple configuration components, configuration information including a configuration proposal for the system concretized, by replacing a configuration component with another configuration component or adding the configuration component;

concretizing a model of the configuration proposal by updating the model using model information relating to a feature, which is associated with each of multiple configuration components of the concretized configuration proposal and indicates a constraint condition required in the system from a facet other than a configuration of the system, the feature being at least one of processing time in the system, time required for recovery of the system, and security in the system;

generating information required for evaluation of the configuration proposal based on the concretized model, and evaluating whether the configuration proposal satisfies or not the constraint condition based on the information; and referencing the information without referencing the configuration information; or referencing the configuration information without referencing the information.

* * * * *